US012059716B2

(12) United States Patent
Kehoe et al.

(10) Patent No.: US 12,059,716 B2
(45) Date of Patent: *Aug. 13, 2024

(54) CLOSET AUGER

(71) Applicant: MILWAUKEE ELECTRIC TOOL CORPORATION, Brookfield, WI (US)

(72) Inventors: Sean T. Kehoe, Waukesha, WI (US); Ryan James Denissen, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 332 days.

This patent is subject to a terminal disclaimer.

(21) Appl. No.: 17/538,370

(22) Filed: Nov. 30, 2021

(65) Prior Publication Data

US 2022/0088649 A1 Mar. 24, 2022

Related U.S. Application Data

(60) Continuation of application No. 16/658,502, filed on Oct. 21, 2019, now Pat. No. 11,185,898, which is a (Continued)

(51) Int. Cl.

*B08B 9/045* (2006.01)
*B65H 75/36* (2006.01)
(Continued)

(52) U.S. Cl.

CPC ........... *B08B 9/045* (2013.01); *B65H 75/364* (2013.01); *E03C 1/302* (2013.01); *E03D 9/00* (2013.01); *E03F 9/005* (2013.01); *B08B 9/043* (2013.01)

(58) Field of Classification Search

CPC ......... B08B 9/027; B08B 9/047; B08B 9/045; E03C 1/302

See application file for complete search history.

(56) References Cited

U.S. PATENT DOCUMENTS 2,244,735 A 6/1941 Silverman
2,779,041 A 1/1957 Silverman
(Continued)

FOREIGN PATENT DOCUMENTS

DE 29910343 U1 9/1999
DE 102018115680 B3 10/2019
WO 2006112847 10/2006

*Primary Examiner* — Michael D Jennings
(74) *Attorney, Agent, or Firm* — Michael Best & Friedrich LLP

(57) ABSTRACT

A closet auger includes an elongated casing member extending along an axis, a cable drum rotatably coupled to the elongated casing member, a drive coupling connected to the cable drum to rotate the cable drum about the axis, and a flexible cable having a first length stored within the cable drum and a second length extending through the casing member and out from the casing member. The closet auger also includes a feed assembly having a handle movable along the casing member and a plurality of gripping members carried by the handle. Each gripping member has a first end pivotally coupled to the handle and a second end biased radially outward from the handle. The plurality of gripping members is circumferentially spaced about the axis and operable to selectively engage the flexible cable to push the flexible cable into or pull the flexible cable out of the cable drum.

21 Claims, 18 Drawing Sheets

Related U.S. Application Data division of application No. 15/435,482, filed on Feb. 17, 2017, now Pat. No. 10,486,207.

(60) Provisional application No. 62/296,335, filed on Feb. 17, 2016.

(51) Int. Cl.

| | |
|---|---|
| ***E03C 1/302*** | (2006.01) |
| ***E03D 9/00*** | (2006.01) |
| ***E03F 9/00*** | (2006.01) |
| *B08B 9/043* | (2006.01) |

(56) References Cited

U.S. PATENT DOCUMENTS

| | | | | |
|---|---|---|---|---|
| 2,961,675 | A | 11/1960 | Stickney | |
| 3,121,244 | A | 2/1964 | Hunt | |
| 3,246,354 | A | 4/1966 | Cooney et al. | |
| 3,691,583 | A | 9/1972 | Silverman et al. | |
| 3,897,602 | A | 8/1975 | Waterbury | |
| 4,364,140 | A | 12/1982 | Irwin | |
| 4,617,693 | A | 10/1986 | Meyer et al. | |
| 4,763,374 | A | 8/1988 | Kaye | |
| 4,773,115 | A * | 9/1988 | Smith | B08B 9/047 15/104.31 |
| 4,956,889 | A | 9/1990 | Kirk | |
| 5,018,234 | A | 5/1991 | Meyer et al. | |
| 5,230,116 | A | 7/1993 | Rodriguez | |
| 5,414,888 | A | 5/1995 | Irwin | |
| 5,901,401 | A | 5/1999 | Rutkowski et al. | |
| 5,987,684 | A | 11/1999 | Evans | |
| 6,158,076 | A | 12/2000 | Rutkowski et al. | |
| 6,343,398 | B1 | 2/2002 | Silverman et al. | |
| 6,421,871 | B1 | 7/2002 | Peach et al. | |
| 6,470,525 | B1 | 10/2002 | Silverman | |
| 6,615,436 | B1 | 9/2003 | Burch, Jr. et al. | |
| 6,637,064 | B2 | 10/2003 | Silverman et al. | |
| 7,367,077 | B2 | 5/2008 | Rutkowski et al. | |
| 7,526,827 | B1 * | 5/2009 | Bitterman | B08B 9/047 15/104.31 |
| 7,685,669 | B2 | 3/2010 | Rutkowski et al. | |
| 7,889,980 | B2 | 2/2011 | Sooy | |
| 8,434,186 | B2 | 5/2013 | Wildauer et al. | |
| 8,826,483 | B2 | 9/2014 | Rutkowski et al. | |
| 10,443,225 | B2 | 10/2019 | Hoyt | |
| 10,465,372 | B2 | 11/2019 | Bowles et al. | |
| 10,570,596 | B1 | 2/2020 | Schneck et al. | |
| 10,987,708 | B2 | 4/2021 | Szucs et al. | |
| 2008/0098544 | A1 | 5/2008 | Rutkowski et al. | |
| 2008/0148503 | A1 | 10/2008 | Babb et al. | |
| 2008/0244816 | A1 | 10/2008 | Babb et al. | |
| 2013/0160227 | A1 | 6/2013 | Rutkowski et al. | |
| 2014/0223679 | A1 | 8/2014 | Silverman et al. | |
| 2015/0113748 | A1 | 7/2015 | Rutkowski et al. | |
| 2020/0080293 | A1 | 3/2020 | Krohlow | |
| 2021/0159818 | A1 | 5/2021 | Moghe et al. | |
| 2021/0172162 | A1 | 6/2021 | Cole et al. | |
| 2021/0205863 | A1 | 7/2021 | Rutkowski et al. | |
| 2023/0398585 | A1 | 12/2023 | Lindsey et al. | |

* cited by examiner

CLOSET AUGER

CROSS-REFERENCE TO RELATED APPLICATION

This application is a continuation of U.S. application Ser. No. 16/658,502 filed on Oct. 21, 2019, now U.S. Pat. No. 11,185,898, which is a divisional of U.S. patent application Ser. No. 15/435,482, filed on Feb. 17, 2017, now U.S. Pat. No. 10,486,207, which claims priority to U.S. Provisional Patent Application No. 62/296,335, filed on Feb. 17, 2016, the entire contents of all of which are incorporated by reference herein.

BACKGROUND

The present invention relates to drain cleaning devices, such as closet augers.

Typically, drain cleaning devices are used to route out foreign material creating clogs and stoppages from plumbing pipelines and the like by the use of an elongated flexible coiled spring cable or cleaning "snake" rotatably drivable about its own axis. The drain cleaning apparatus may be a closet auger. During operation, a distal end of the cleaning snake is inserted into a pipeline and rotated to force the snake through the pipeline to workout clogs and stoppages within the pipeline. Accordingly, the closet auger may be used in cleaning out clogged toilets, sinks, bathtubs, and other plumbing circuits.

SUMMARY

In one embodiment, the invention provides a closet auger including an elongated casing member extending along an axis; an elongated drive member telescopically received in the casing member and movable between an extended position and a retracted position relative to the casing member along the axis, the drive member being rotatable relative to the casing member about the axis; a flexible cable having an end removably connectable to the drive member in a first configuration, where a length of the flexible cable is retracted within the drive member, and a second configuration, where the length of the flexible cable extends from the drive member; and a cable retention assembly supported by the casing member, the cable retention assembly configured to selectively engage the flexible cable to inhibit movement of the flexible cable relative to the casing member, the drive member being movable relative to the flexible cable when the cable retention assembly engages the flexible cable to change between the first configuration and the second configuration.

In another embodiment, the invention provides a method of using a closet auger including an elongated casing member extending along an axis, an elongated drive member telescopically received in the casing member and being rotatable relative to the casing member about the axis, a flexible cable having an end, and a cable retention assembly supported by the casing member, the method including the steps of: connecting the end of the flexible cable to the drive member in a first configuration, where a length of the flexible cable is retracted within the drive member; gripping the flexible cable with the cable retention assembly to inhibit movement of the flexible cable relative to the casing member; disconnecting the end of the flexible cable from the drive member; sliding the drive member relative to the casing member and the flexible cable from a retracted position to an extended position; and connecting the end of the flexible cable to the drive member in a second configuration, where the length of the flexible cable extends from the drive member.

In yet another embodiment, the invention provides a closet auger including an elongated casing member extending along an axis and having an upper end and a lower end; a cable drum rotatably coupled to the upper end of the elongated casing member; a drive coupling connected to the cable drum to rotate the cable drum about the axis; a flexible cable having a first length stored within the cable drum and a second length extending through the casing member and out from the lower end of the casing member; and a feed assembly including a handle movable along the casing member and a plurality of gripping members carried by the handle, each gripping member having a first end pivotally coupled to the handle and a second end biased radially outward from the handle, the plurality of gripping members being circumferentially spaced about the axis and operable to selectively engage the flexible cable to push the flexible cable into or pull the flexible cable out of the cable drum.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figures 10, 11:
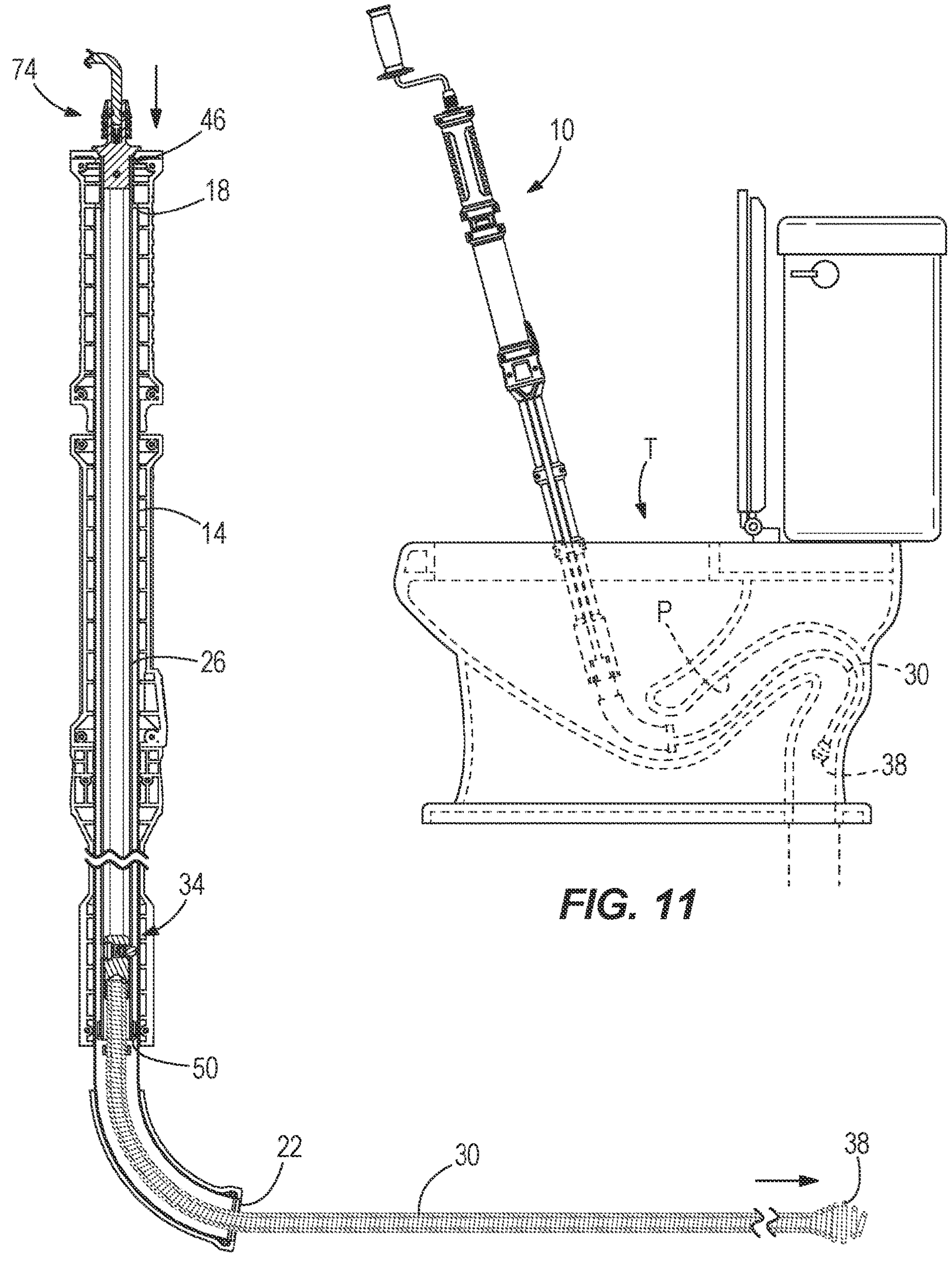
FIG. 10 is a cross-sectional view of the closet auger of FIG. 1, illustrating the drive member in the retracted position within the casing member, and the flexible cable in the second configuration.
FIG. 11 is a side view of the closet auger in operation with a toilet.

FIGS. 1-10 illustrate a closet auger 10 for clearing a drain pipeline P of a fixture, such as a toilet T, as shown in FIG. 11. The closet auger 10 may also be used to clear drain pipelines of other types of fixtures (e.g., urinals, drains, etc.).

Figure 1:
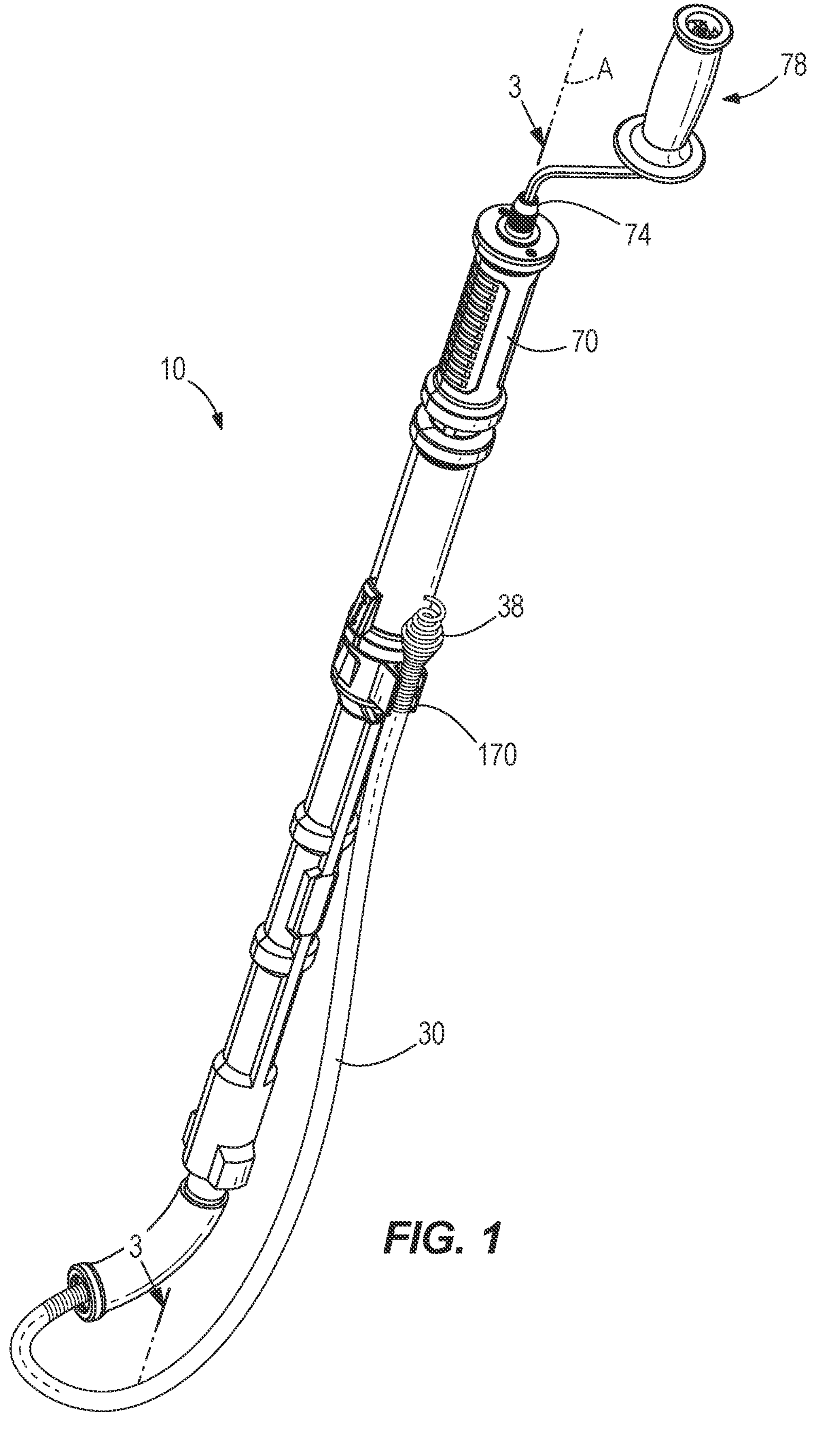
FIG. 1 is a perspective view of a closet auger in accordance with one embodiment of the invention.
Figure 2:
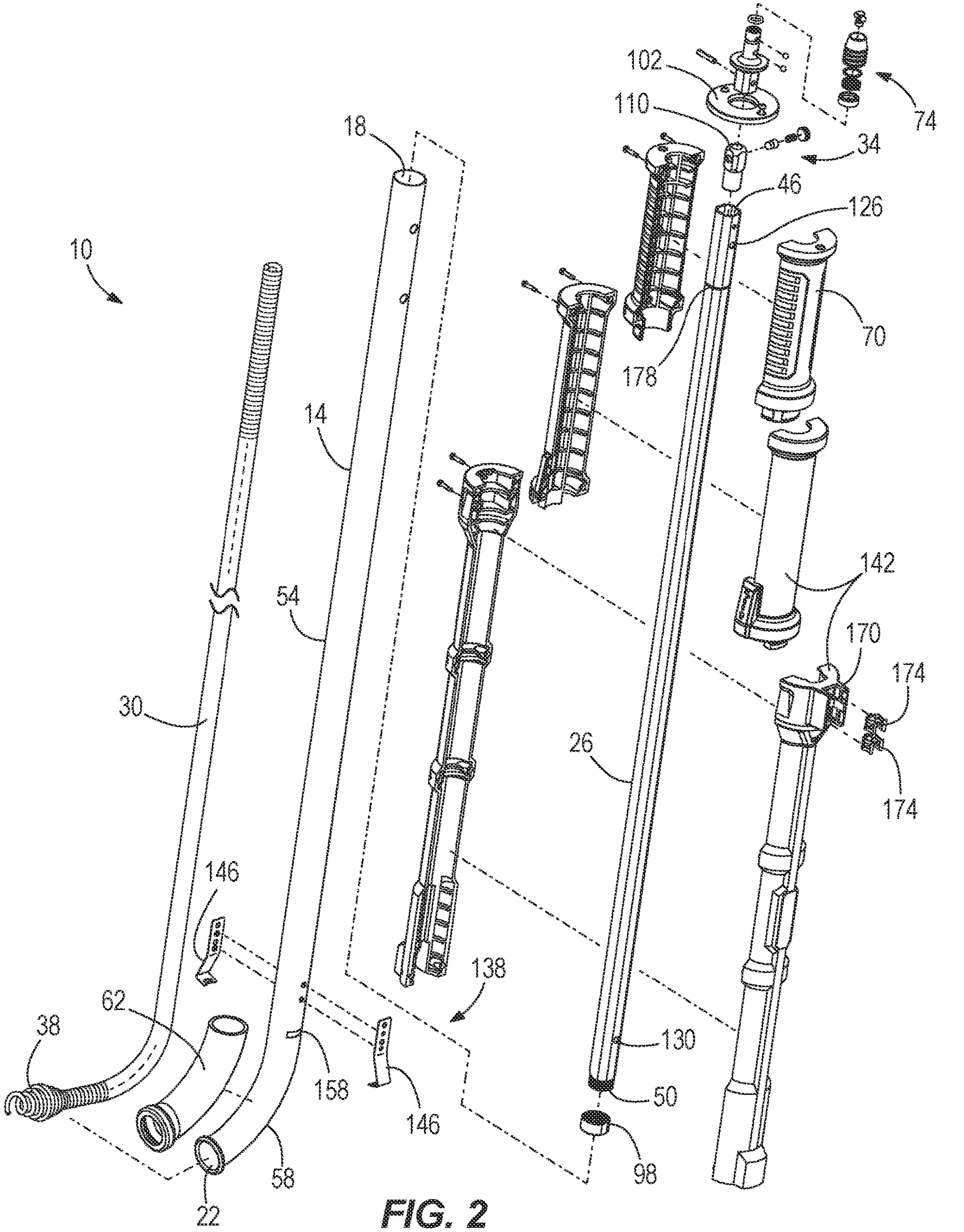
FIG. 2 is an exploded view of the closet auger of FIG. 1.

With reference to FIG. 2, the closet auger 10 includes an outer tube or elongated hollow casing member 14 generally extending along a longitudinal axis A (FIG. 1) from an upper end 18 toward a lower end 22, an inner tube or elongated hollow drive member 26 telescopically receivable within the casing member 14 via the upper end 18, and a flexible coiled spring cable or snake 30 also receivable within the casing member 14 and extending out of the lower end 22. The snake 30 includes an end with a connecting assembly 34 and an opposite end having a head 38 for breaking up clogs and objects within the drain pipeline. The connecting assembly 34 selectively connects the snake 30 to the drive member 26 adjacent either a first end 46 or a second end 50 of the drive member 26, as described in more detail below. The casing member 14 includes a straight portion 54 extending along the longitudinal axis A and a curved portion 58 extending from the straight portion 54 away from the axis A. The curved portion 58 is shaped to fit within an initial curved portion of the drain pipeline P within the toilet T so that the closet auger 10 can be oriented to extend generally upward, as shown in FIG. 11. A protective cover member or boot 62 fits over the curved portion 58. The protective cover member 62 may be made of rubber or a similar soft polymer to prevent the lower end 22 of the casing member 14 from scratching or damaging the fixture during operation of the closet auger 10.

Figure 25:
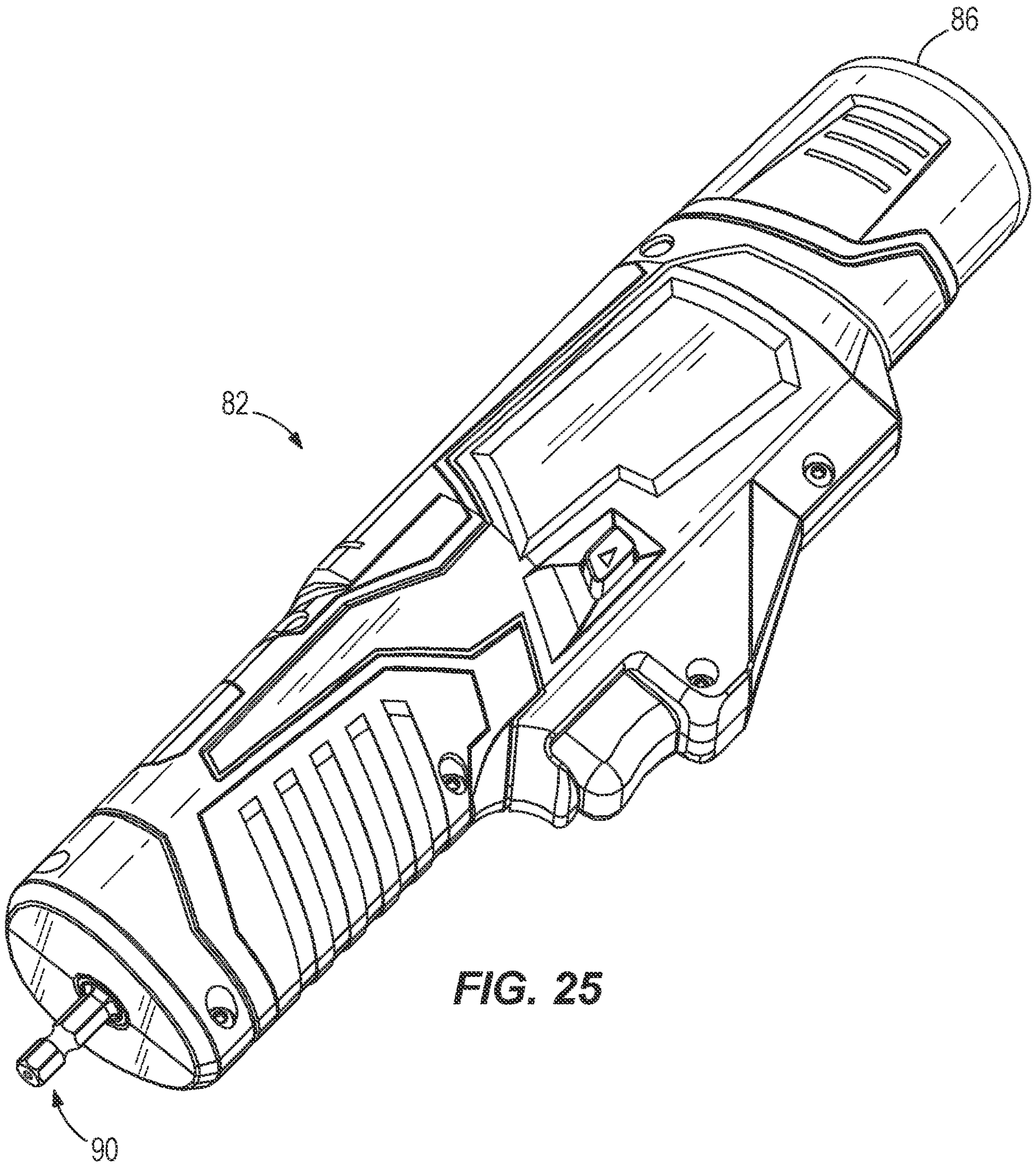
FIG. 25 is a perspective view of a motorized drive unit for use with a closet auger.

With continued reference to FIGS. 1-2, the closet auger 10 further includes a fixed handle 70 fixed to the casing member 14 adjacent the upper end 18 of the casing member 14 to allow a user to hold the closet auger 10 in place during operation. The fixed handle 70 may be fixed to the casing member 14 by fasteners or by another suitable method (e.g., adhesive, press fit, etc.). The closet auger 10 further includes a drive coupling mechanism 74 to connect a manual drive unit or crank handle 78 (see FIG. 1) to the first end 46 of the drive member 26 for manually rotationally driving the drive member 26 relative to the casing member 14 about the longitudinal axis A. Alternatively, instead of the crank handle 78, a motorized drive unit 82 (see FIG. 25) may be coupled to the first end 46 of the drive member 26 via the drive coupling mechanism 74. The motorized drive unit 82 includes a motor (not shown) powered by a battery 86 for selectively rotationally driving a drive mechanism 90 couplable to the first end 46 of the drive member 26 by the drive coupling mechanism 74.

The drive member 26 may be telescopically moved along the axis A relative to the casing member 14 between a first, retracted position (see FIGS. 3, 5, and 10), in which the drive member 26 is telescopically received within the casing member 14, and a second, extended position (see FIGS. 4 and 9), in which the drive member 26 is telescopically extended from the casing member 14. When the drive member 26 is in the first position, the snake 30 is fully extended out of the lower end 22 of the casing member 14. When the drive member 26 is in the second position, a length of the snake 30 is drawn into the casing member 14. While a user grips the closet auger 10 at the fixed handle 70, the user may also grip the crank handle 78 (or the motorized drive unit 82) connected to the first end 46 of the drive member 26 to telescopically move the drive member 26 relative to the casing member 14 between the first and second positions to either extend the snake 30 from or draw the snake 30 into the casing member 14. An annular stop 98 (FIGS. 7-8) is threadingly coupled to the second end 50 of the drive member 26. The annular stop 98 contacts an end plate 102 (FIGS. 5-6) (through which the drive member 26 extends) coupled to the fixed handle 70 adjacent the upper end 18 of the casing member 14 to inhibit the drive member 26 from being completely removed from the casing member 14.

Figure 3:
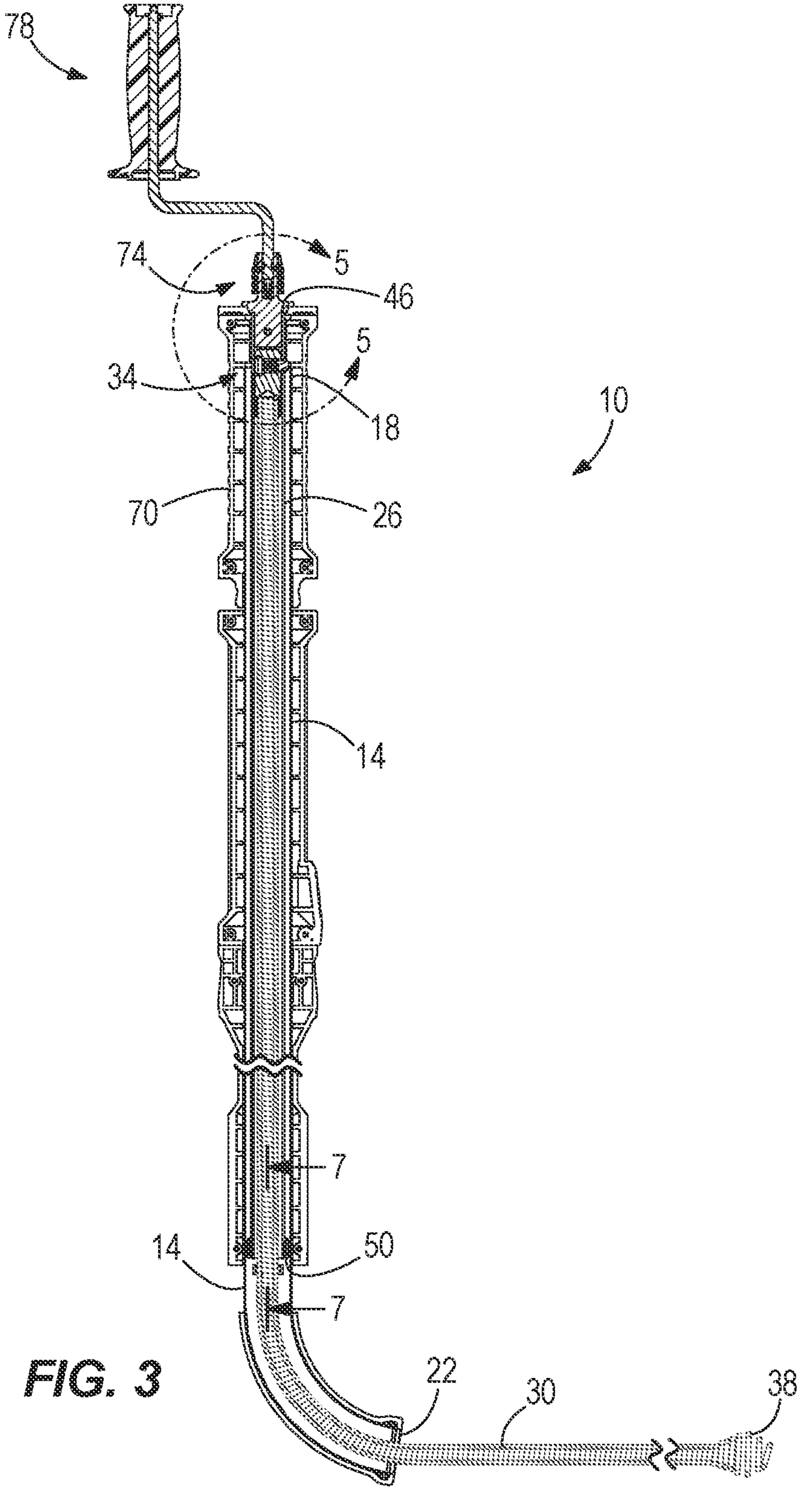
FIG. 3 is a cross-sectional view of the closet auger of FIG. 1 taken along line 3-3 in FIG. 1, illustrating a drive member of the closet auger in a retracted position within a casing member, and a flexible cable in a first configuration.
Figure 4:
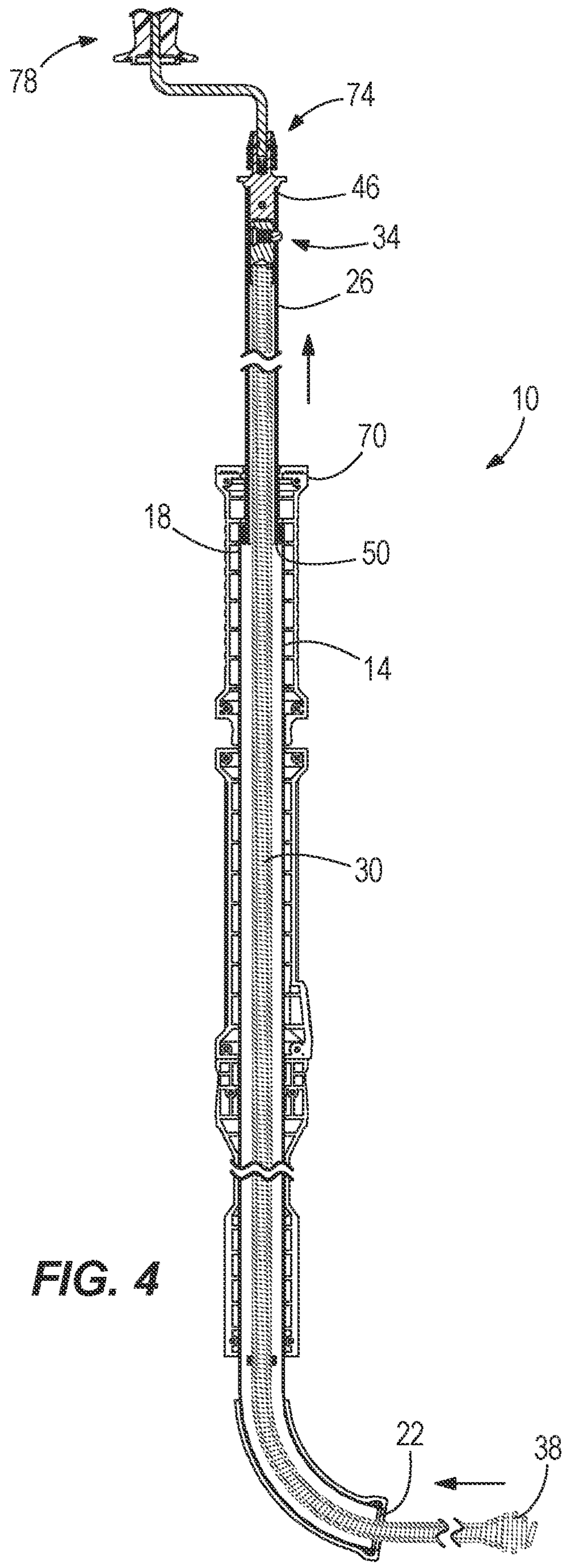
FIG. 4 is another cross-sectional view of the closet auger of FIG. 1, illustrating the drive member in an extended position from the casing member, and the flexible cable in the first configuration.
Figure 5:
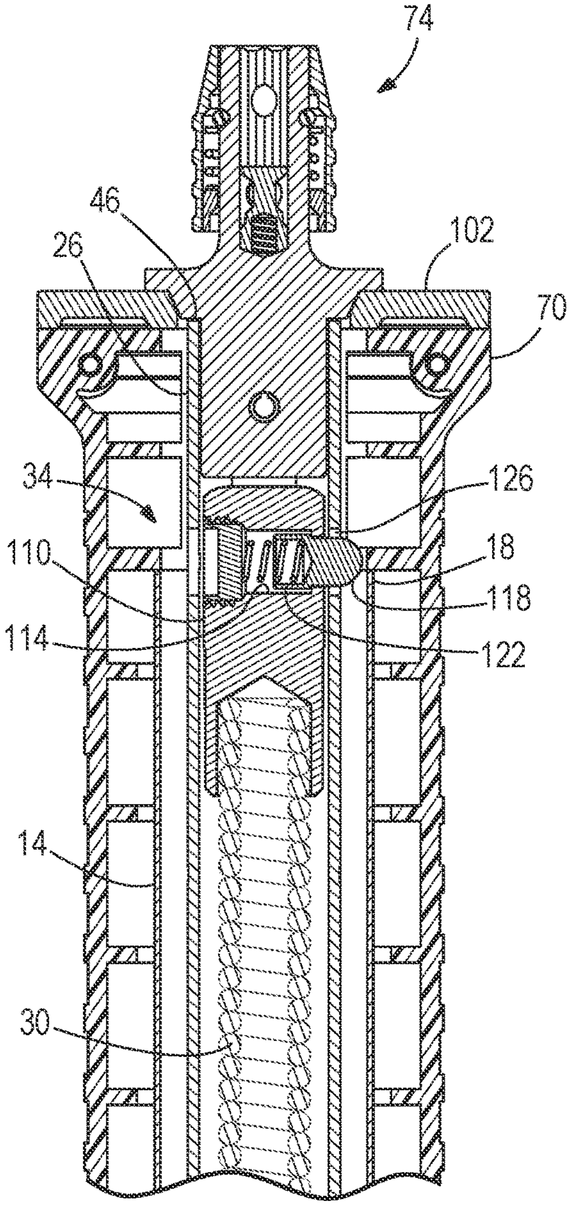
FIG. 5 is an enlarged cross-sectional view of a portion of the closet auger at section 5-5 in FIG. 3.
Figure 9:
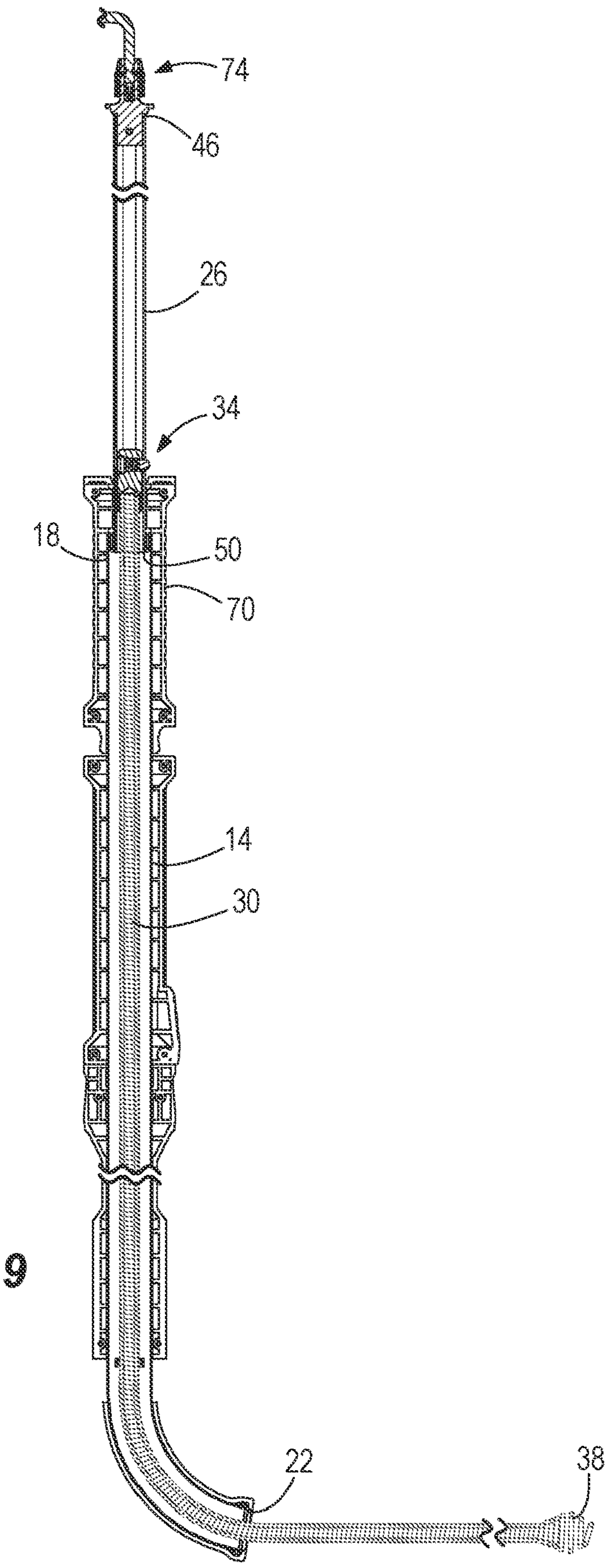
FIG. 9 is a cross-sectional view of the closet auger of FIG. 1, illustrating the drive member in the extended position from the casing member, and the flexible cable in a second configuration.

With reference to FIGS. 2 and 5, the connecting assembly 34 of the snake 30 includes a body 110 defining a bore 114 for receiving a detent 118 and a spring 122 arranged to bias the detent 118 radially outwardly. The body 110 is sized to be slidingly received within the drive member 26. The detent 118 is engageable with a first aperture 126 or a second aperture 130 defined in the drive member 26 adjacent the first and second ends 46, 50 of the drive member 26, respectively. When the detent 118 is engaged with the first aperture 126, a length of the snake 30 is retracted inside the drive member 26 in a sheathed configuration, as shown in FIGS. 3-4. When the detent 118 is engaged with the second aperture 130, the length of the snake 30 is extended from the drive member 26 in an unsheathed configuration, as shown in FIGS. 9-10. Accordingly, the maximum length that the snake 30 extends from the lower end 22 of the casing member 14 in the first position is increased when the snake 30 is in the unsheathed configuration (FIG. 10) as compared to the sheathed configuration (FIG. 3). The length of the snake 30 that is retracted and dispensed from inside the drive member 26 is equivalent to the distance between the first and second apertures 126, 130. In the illustrated embodiment, the length of the snake 30 that can be dispensed from or retracted into the drive member 26 is between approximately 2 feet and approximately 4 feet (e.g., approximately 3 feet). In some embodiments, the length may be less than 2 feet or greater than 4 feet.

While the connecting assembly 34 connects the snake 30 to the drive member 26 in either the sheathed or unsheathed configurations, the snake 30 is rotationally driven about its length by the drive member 26. As best shown in FIG. 2, the body 110 has a cross-section configured to drivingly engage with the cross-section of the drive member 26. Accordingly, the drive member 26 rotationally drives the snake 30 even when the detent 118 is not engaged with either of the first and second apertures 126, 130. In the illustrated embodiment, the cross-section of each of the body 110 and the drive member 26 is square. In other embodiments, the cross-sections may be another shape (e.g., triangular, rectangular, hexagonal, etc.). The cross-section of the casing member 14 is circular to allow the drive member 26 to freely rotate therein.

Figure 8:
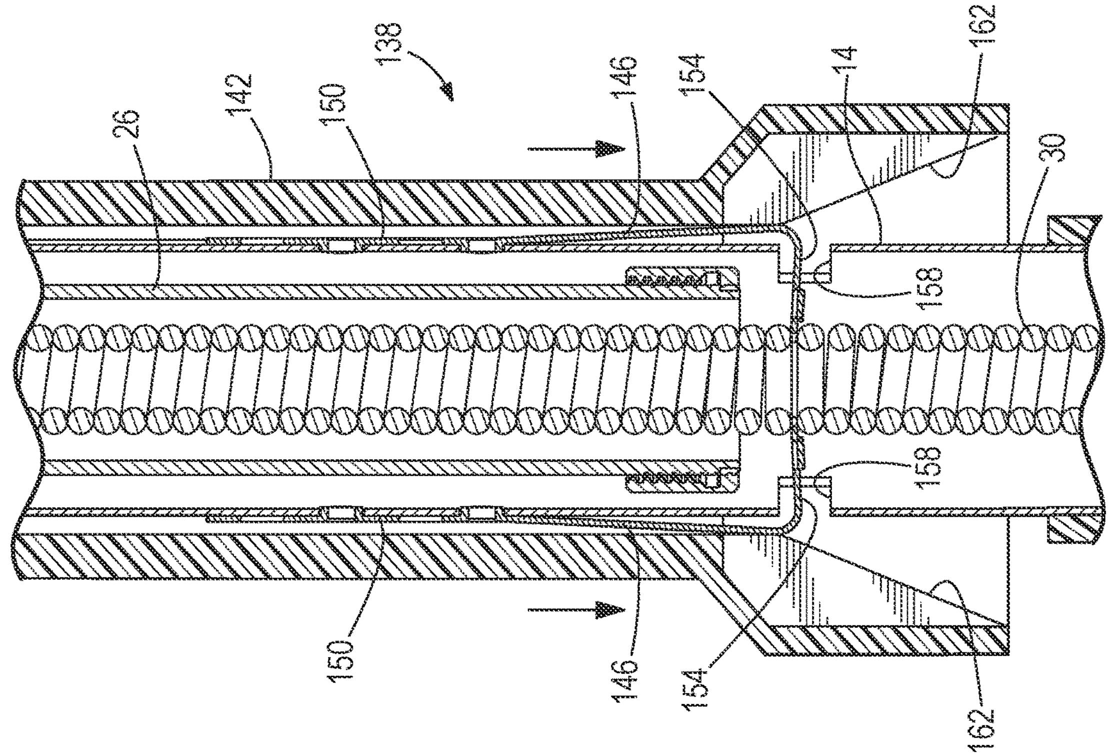
FIG. 8 is an enlarged cross-sectional view of the portion of the closet auger of FIG. 7, illustrating the gripping assembly in an engaged position.
Figure 7:
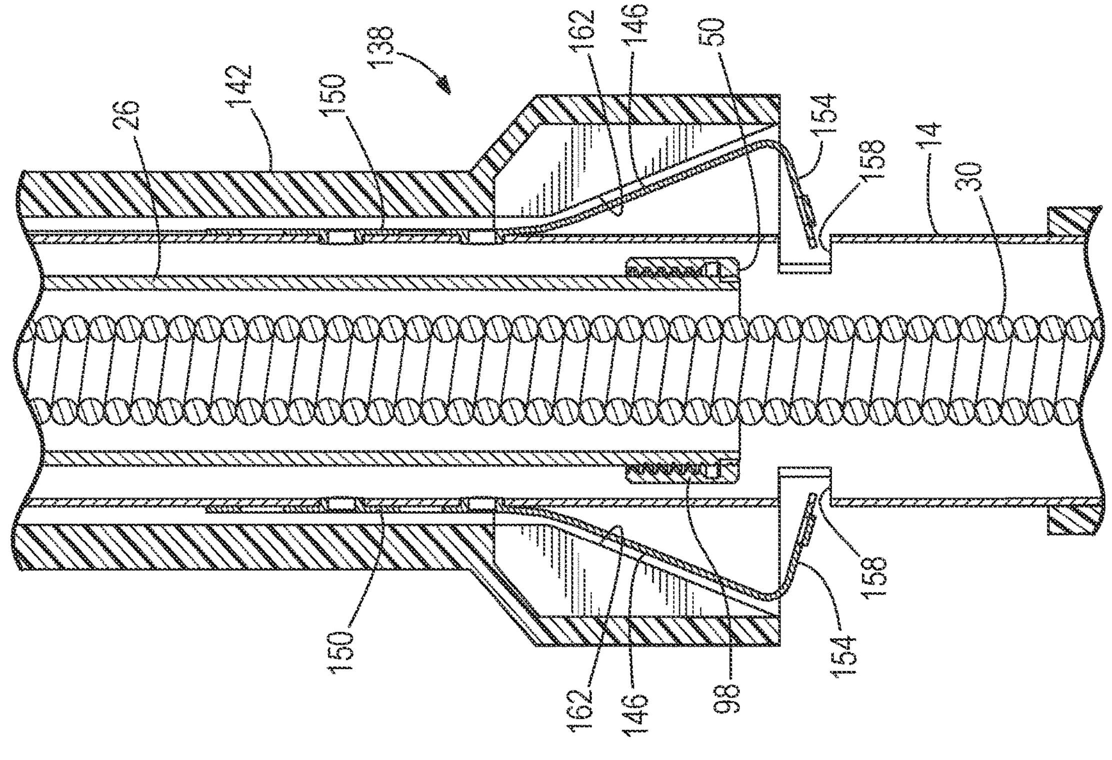
FIG. 7 is an enlarged cross-sectional view of a portion of the closet auger of FIG. 1 taken along line 7-7 in FIG. 3, illustrating a gripping assembly in a disengaged position.

With reference to FIGS. 2 and 7-8, the closet auger 10 further includes a cable retention assembly or gripping assembly 138. The gripping assembly 138 selectively grips the snake 30 to inhibit axial movement of the snake 30 relative to the casing member 14 without requiring a user to directly touch the snake 30. In the illustrated embodiment, the gripping assembly 138 includes a movable handle 142 and a pair of opposed cable retention members or gripping members 146. Each of the opposed gripping members 146 has a first end portion 150 fixedly coupled to the casing member 14 adjacent the lower end 22 of the casing member 14 and a second end 154 extending into the casing member 14 through corresponding slots 158 defined in the casing member 14 on opposite sides of the longitudinal axis A. Each of the gripping members 146 is a flexible spring member such that the second end portion 154 is biased radially outward from the longitudinal axis A, as shown in FIG. 7. The movable handle 142 includes a pair of cam members 162. The movable handle 142 may be manually slid between an upper position (FIG. 7) and a lower position (FIG. 8). When the movable handle 142 is in the upper position, the gripping members 146 are free to be biased outwardly. When the movable handle 142 is moved to the lower position, the second end portions 154 of the gripping members 146 are urged radially inward by the cam members 162 to engage the snake 30 from opposite sides to inhibit movement of the snake 30 relative to the casing member 14, as shown in FIG. 8. In some embodiments, the gripping assembly 138 may include more than two gripping members 146 circumferentially spaced about the axis A. In other embodiments, the gripping assembly 138 may include a single gripping member 146 configured to grip the snake 30 between the second end portion 154 of the gripping member 146 and an inner wall of the casing member 14 or a projection extending therefrom. In some embodiments, the cam members 162 may be replaced with a single cam surface arranged about the axis A to urge all of the gripping members 146 radially inward in the lower position.

With reference to FIGS. 1-2, a cable clip 170 is formed on an outer surface of the movable handle 142. The cable clip 170 secures and holds a portion of the snake 30 extending from the lower end 22 of the casing member 14 alongside the closet auger 10 for storage and travel. The cable clip 170 includes a plurality of spring clips 174 to securely grip the snake 30. In the illustrated embodiment, the spring clips 174 are separate components made of an elastic material such as metal. In some embodiments, the cable clip 170 may be integrally formed of an elastic material for holding the snake 34.

In operation, while the closet auger is in a storage configuration (FIG. 1) in which the snake 30 is in the sheathed configuration within the drive member 26 and the drive member 26 is in the first position within the casing member, a user first disconnects the snake 30 from the cable clip 170 so that the snake 30 may extend freely out of the lower end 22 of the casing member 14, as shown in FIG. 3. While holding the fixed handle 70 with one hand, the user may grasp the crank handle 78 with the other hand and pull up on the drive member 26 causing the drive member 26 to telescopically slide from the first position (FIG. 3) to the second position (FIG. 4), thus drawing the snake 30 into the casing member 14 such that the head 38 is adjacent the lower end 22 of the casing member 14. The head 38 of the snake 30 and the lower end 22 of the casing member 14 are then inserted into the drain pipeline P of the toilet T (FIG. 11). Once inserted, the user may push down on the drive member 26 via the crank handle 78 to move the drive member 26 from the second position back to the first position (FIG. 3) causing the head 38 of the snake 30 to be forced down the drain pipeline P to break up or remove any stoppage therein. The user may also simultaneously rotationally drive the drive member 26 via the crank handle 78 to rotate the head 38 of the snake 30 to assist in breaking up or removing the stoppage. The user may extend and retract the snake 30 from the casing member 14 as necessary until the stoppage is fully broken up or removed.

Figure 6:
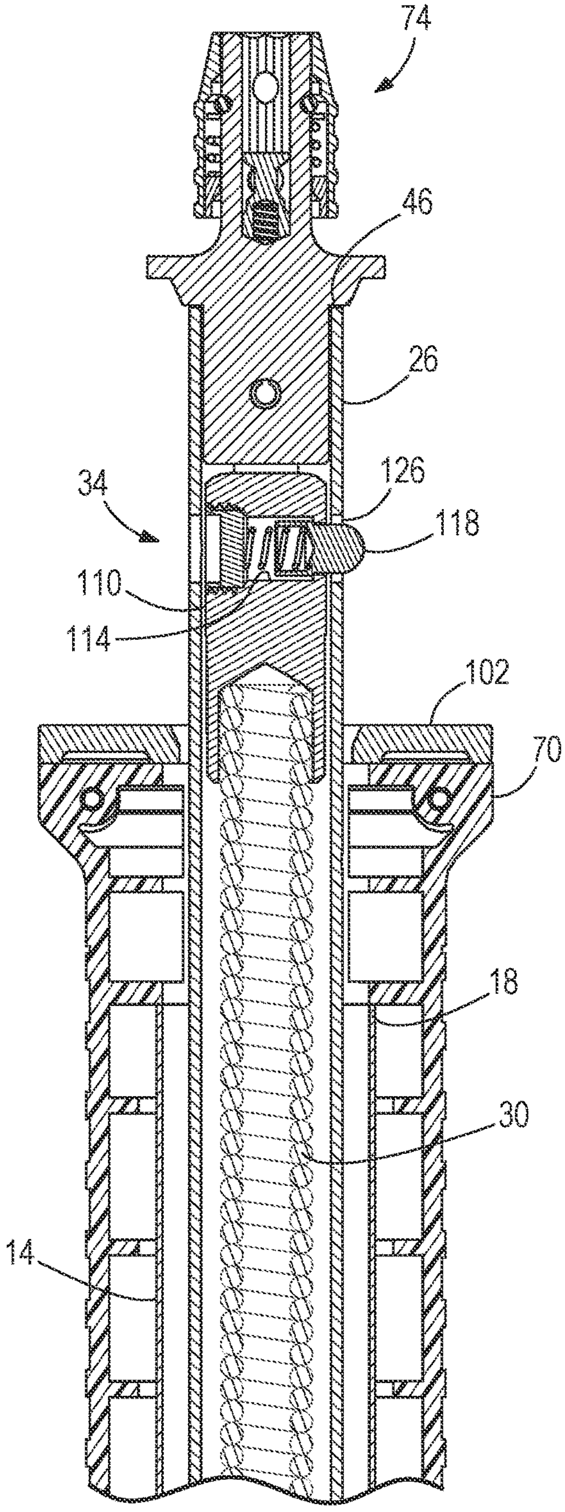
FIG. 6 is an enlarged cross-sectional view of the portion of the closet auger of FIG. 5, illustrating the drive member partially extended from the casing member.

In some cases, the stoppage may be located further down the drain pipeline P than the snake 30 is capable of reaching while the drive member 26 is in the first position and the snake 30 is in the sheathed configuration within the drive member 26. As such, it may be necessary to unsheathe the length of the snake 30 retracted into the drive member 26 to increase the length of the snake 30 that may extend from the lower end 22 of the casing member 14. To do this while the drive member 26 is in the first position (FIG. 3), the user first pulls up on the crank handle 78 to partially extend the drive member 26 out of the casing member 14 such that the detent 118 extending from the first aperture 126 is exposed from the upper end 18 of the casing member 14, as shown in FIG. 6. The user then slides the movable handle 142 relative to the casing member 14 from the upper position (FIG. 7) to the lower position (FIG. 8), causing the cam members 162 to urge the first ends 46 of the gripping members 146 radially inward to engage the snake 30 and inhibit axial movement of the snake 30 relative to the casing member 14. The user may then manually depress the detent 118 against the bias of the spring 122 to unlock the detent 118 from the first aperture 126. The user then pulls up on the crank handle 78 to extend the drive member 26 toward the second position. Due to the snake 30 being retained relative to the casing member 14, the length of the snake 30 within the drive member 26 is unsheathed, until the detent 118 reaches the second aperture 130 in the drive member 26. The detent 118 is then biased outwardly to engage the second aperture 130 and lock the snake 30 in the unsheathed configuration with the drive member 26, as shown in FIG. 9.

The drive member 26 includes an indicator mark 178 (see FIG. 2) adjacent the first end 46 of the drive member 26 to visually indicate to the user the maximum extent that the drive member 26 can be partially extended from the upper end 18 of the casing member 18 (see FIG. 6) before gripping the snake 30 with the griping members 146 and unsheathing the snake 30 from the drive member 26 in the unsheathed configuration. Accordingly, the indicator mark 178 helps inhibit the user from over extending the drive member 26 from the upper end 18 of the casing member 14 and creating a situation where after gripping the snake 30 with the gripping assembly 138 and pulling the drive member 26 to the second position, the second aperture 130 does not reach the detent 118 to interface with and lock the connecting assembly 34 adjacent the second end 50 of the drive member 26. In the illustrated embodiment, the indicator mark 178 is a groove defined about the drive member 26. In other embodiments, the indicator mark 178 may include paint within the groove. The paint may be a color that contrasts with the color of the drive member 26 to provide improved visual indication. In some embodiments, the indicator mark 178 may be painted on the surface of the drive member 26 without a groove defined in the drive member 26.

Once the snake 30 is in the unsheathed configuration, the user may move the movable handle 142 relative to the casing member 14 from the lower position (FIG. 8) back to the upper position (FIG. 7) allowing the first end 46 of the gripping members 146 to be biased radially outward, thus disengaging the second end portions 154 of the gripping members 146 from the snake 30. Similarly as described above, the user may then push down on the drive member 26 via the crank handle 78 to move the drive member 26 into the casing member 14 from the second position back toward the first position (FIG. 10), causing the head 38 of the snake 30 to be moved further down the drain pipeline P by the increased length of the snake 30 unsheathed from the drive member 26 or until the head 38 reaches the stoppage. The user may then extend and retract the snake 30 from the casing member 14 while rotationally driving the drive member 26 to rotate the head 38 of the snake 30 to assist in breaking up or dislodging the stoppage.

To retract the snake 30 back within the drive member 26 in the sheathed configuration, the opposite sequence of events is performed. More specifically, the drive member 26 is extended out of the casing member 14 to the first position such that the detent 118 extending from the second aperture 130 is exposed from the upper end 18 of the casing member 14, as shown in FIG. 9. The user then slides the movable handle 142 relative to the casing member 14 from the upper position (FIG. 7) to the lower position (FIG. 8) to grip the snake 30 with the gripping members 146 to inhibit axial movement of the snake 30 relative to the casing member 14, as described above. The user may then manually depress the detent 118 against the bias of the spring 122 to unlock the detent 118 from the second aperture 130. The user then pushes down on the crank handle 78 to retract the drive member 26 toward the first position. Due to the snake 30 being retained relative to the casing member 14, the length of the snake 30 is again sheathed within the drive member 26, until the detent 118 reaches the first aperture 126 in the drive member 26. The detent 118 is then biased outwardly to engage the second aperture 130 and lock the snake 30 back in the sheathed configuration, as shown in FIG. 3. The lower end 22 of the casing member 14 and the snake 30 is then pulled out of the drain pipeline P. The snake 30 may then be clipped to the side of the closet auger 10 by the cable clip 170 to secure the snake 30 back in the storage configuration.

Figure 12:
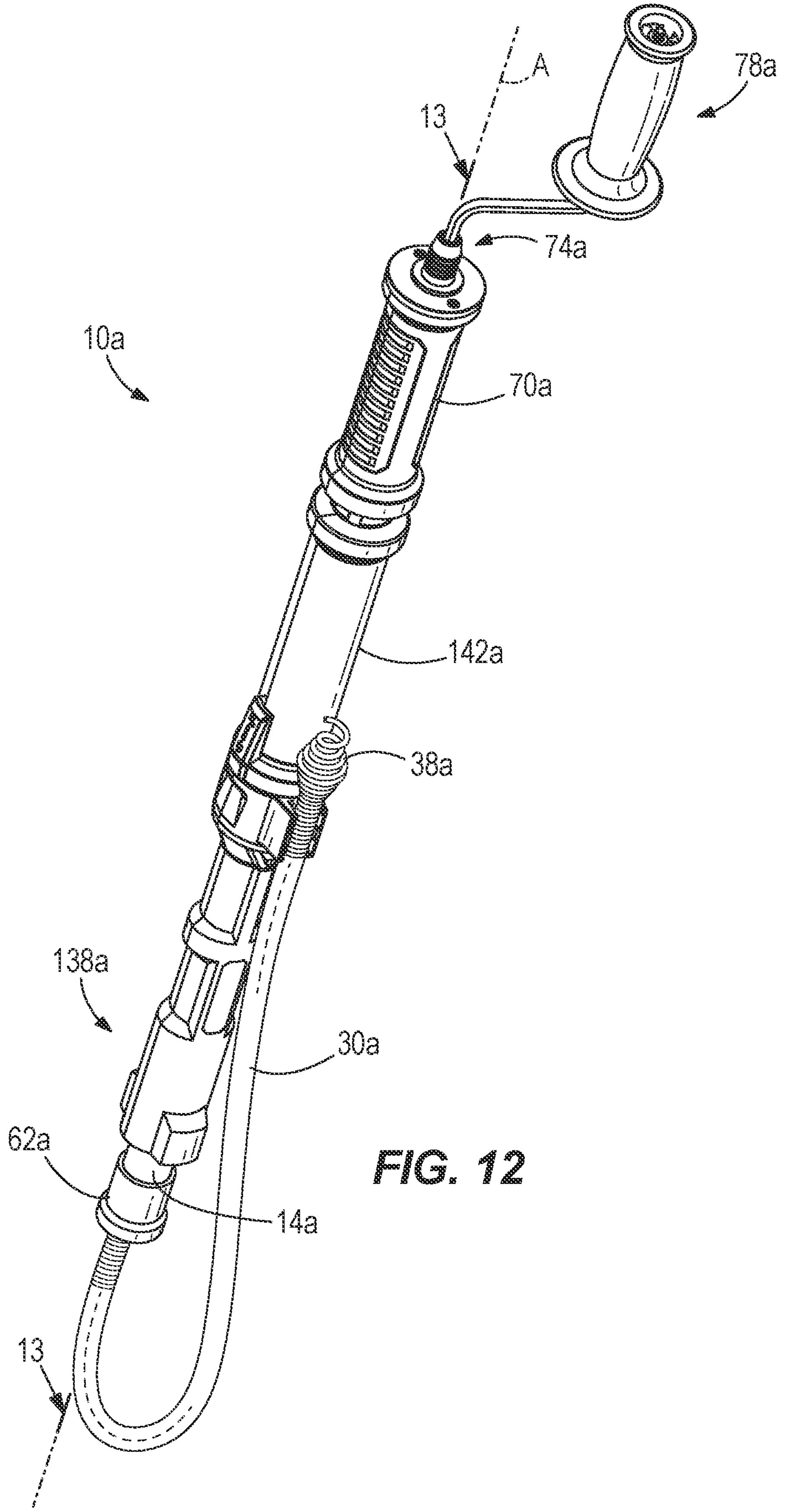
FIG. 12 is a perspective view of a closet auger in accordance with another embodiment of the invention.
Figure 13:
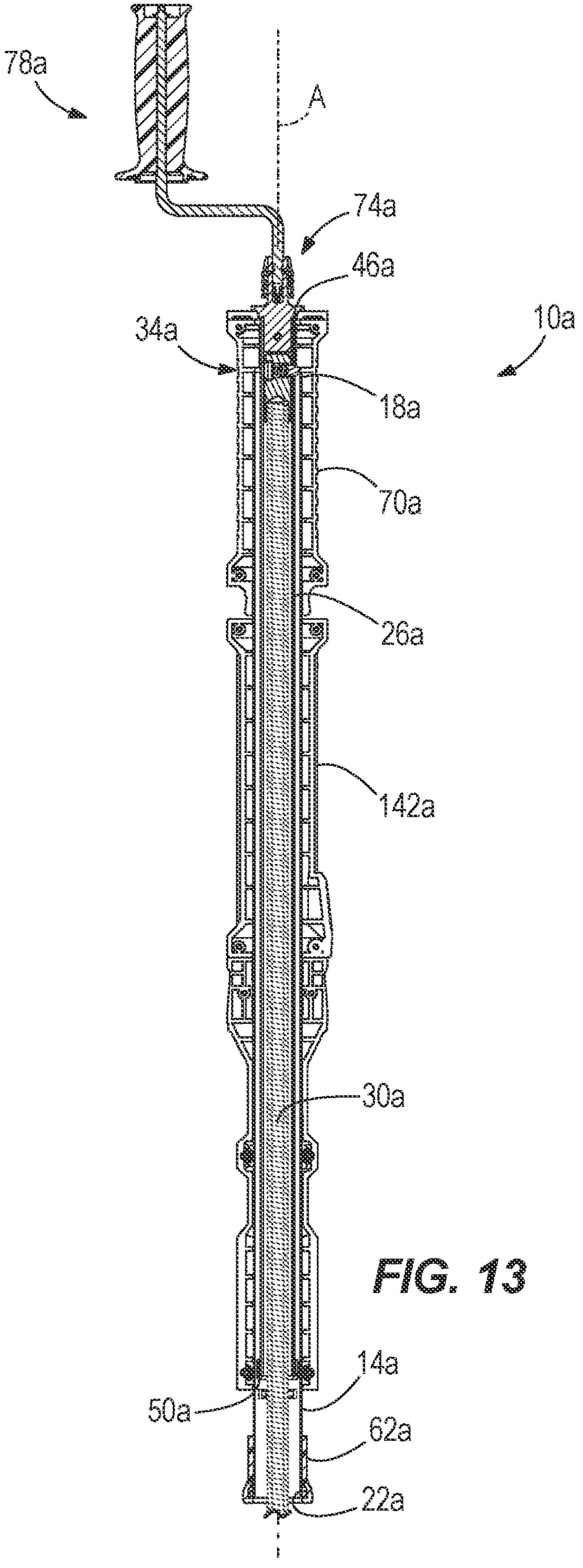
FIG. 13 is a cross-sectional view of the closet auger of FIG. 12 taken along line 13-13 in FIG. 12.
Figure 14:
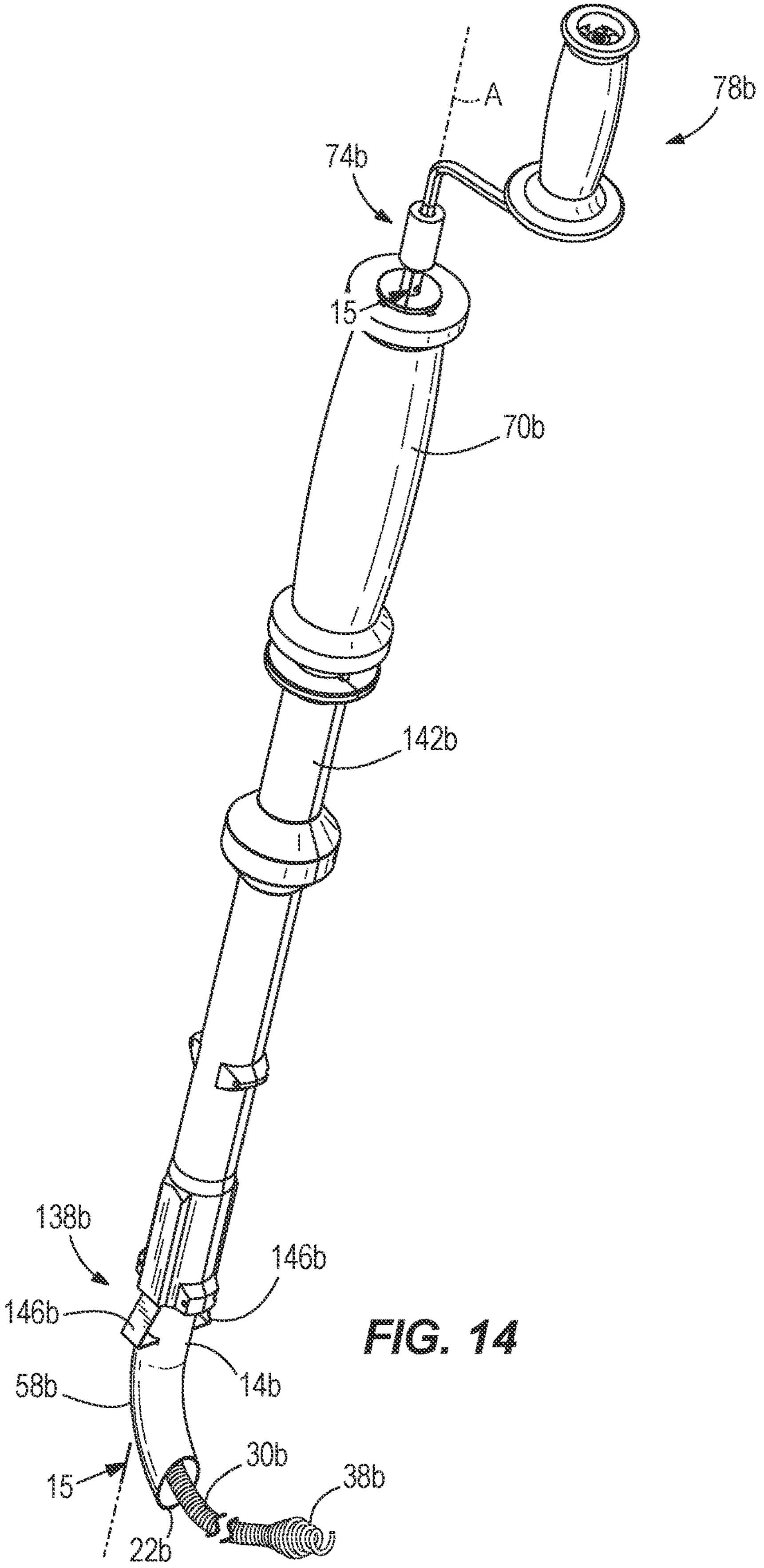
FIG. 14 is a perspective view of a closet auger in accordance with yet another embodiment of the invention.
Figure 15:
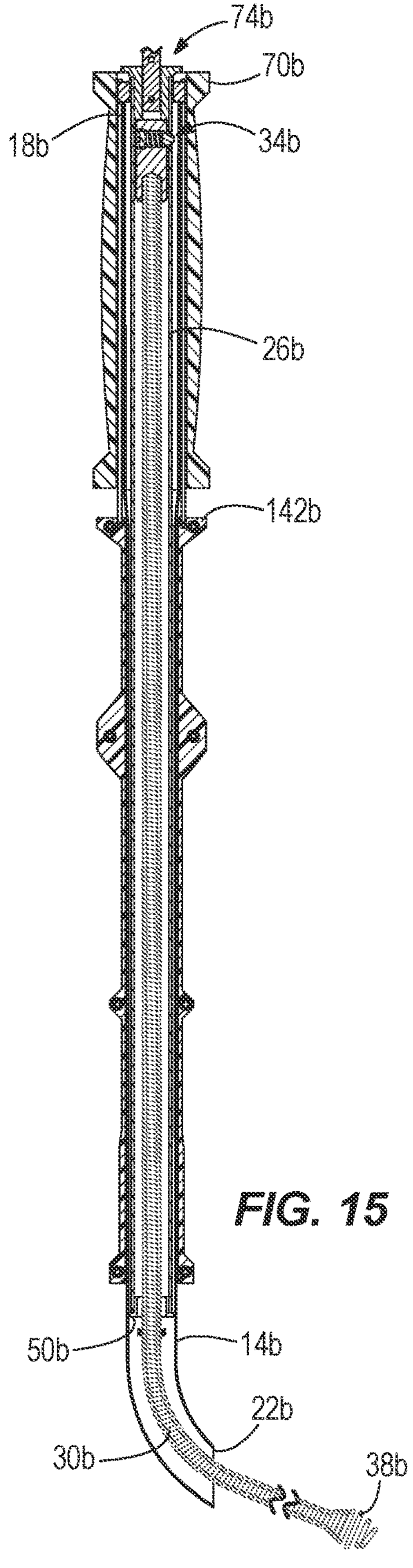
FIG. 15 is a cross-sectional view of the closet auger of FIG. 14 taken along line 15-15 in FIG. 14.
Figure 16:
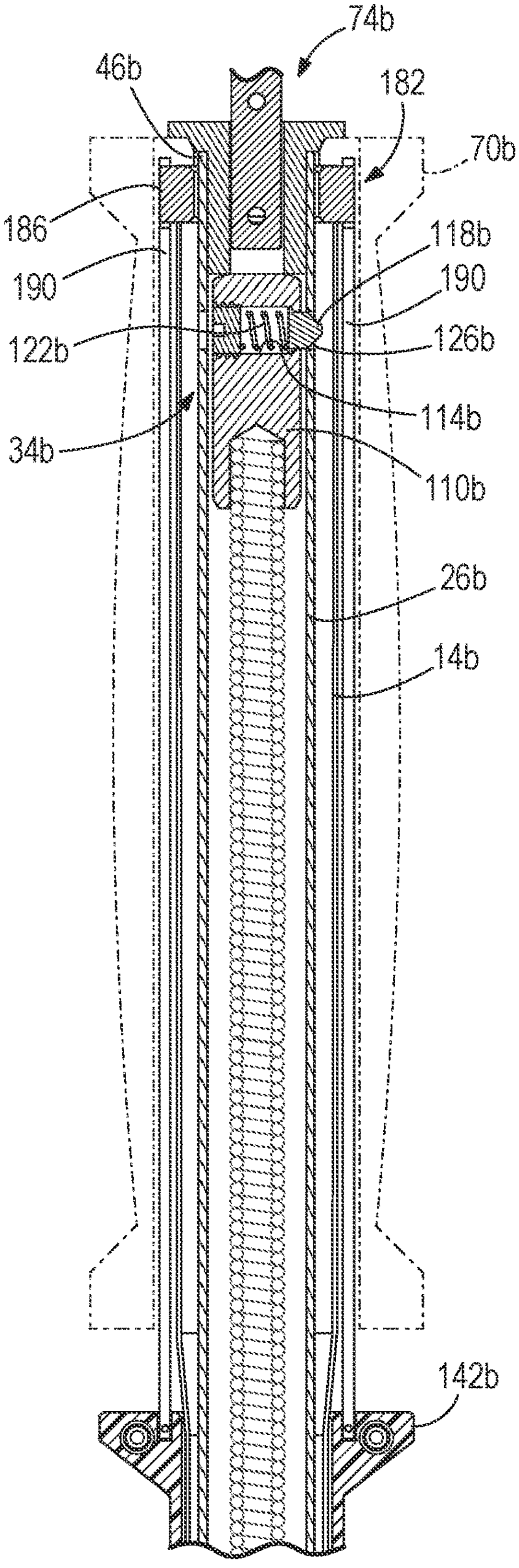
FIG. 16 is an enlarged cross-sectional view of a portion of the closet auger of FIG. 14.

FIGS. 12-13 illustrate a closet auger 10*a* in accordance with another embodiment of the invention. Like components and features are identified with like reference numerals plus the letter "a" and will not be described again in detail. With the exception of some minor distinctions in shape of some of the components, the closet auger 10*a* of FIGS. 12-13 is substantially identical to those features in the closet auger of FIGS. 1-10. In particular, the lower end 22*a* of the casing member 14*a* is positioned along the longitudinal axis A, and the casing member 14*a* does not include a curved portion like the curved portion 58 of the casing member 14 of FIGS. 1-10. The protective cover member 62*a* is straight to accommodate the lower end 22*a* of the casing member 14*a* being straight. In addition, the overall length of the closet auger 10*a* of FIGS. 12-13 is decreased as compared to the closet auger 10 of FIGS. 1-10. These features allow the closet auger 10*a* to be more compact and more suitable for use with urinals and similar fixtures in which the pipeline being cleaned has an initial portion extending straight downward (e.g., bathtubs, showers, etc.). The head 38*a* of the snake 30 is also smaller to fit into the smaller drains, such as drains of a urinal, which is typically between 1.5 and 2 inches (as opposed to 3 inches for toilet drains). The manner of operation of the closet auger 10*a* of FIGS. 12-13 is otherwise identical to that described above in connection with the closet auger 10 of FIGS. 1-10.

FIGS. 14-19 illustrate a closet auger 10*b* in accordance with yet another embodiment of the invention. Like components and features are identified with like reference numerals plus the letter "b" and will not be described again in detail. The closet auger 10*b* of FIGS. 14-19 is substantially similar in structure and operation to the closet augers 10, 10*a* of FIGS. 1-10 and FIGS. 12-13. Accordingly, only differences in structure and operation are described in detail below.

Figure 19:
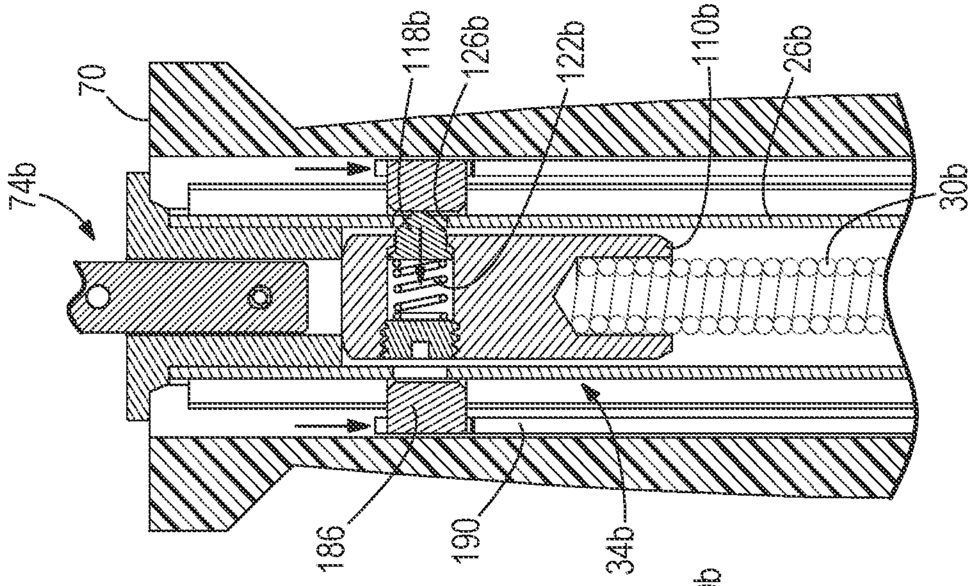
FIG. 19 is an enlarged cross-sectional view of the portion of the closet auger of FIG. 17, illustrating the detent release collar in the engaged position.
Figure 18:
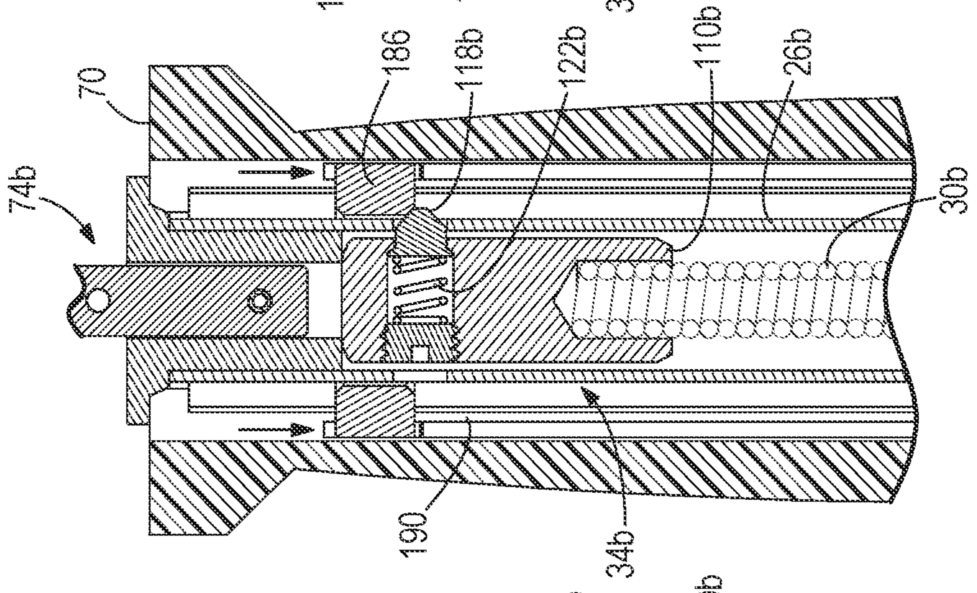
FIG. 18 is an enlarged cross-sectional view of the portion of the closet auger of FIG. 17.
Figure 17:
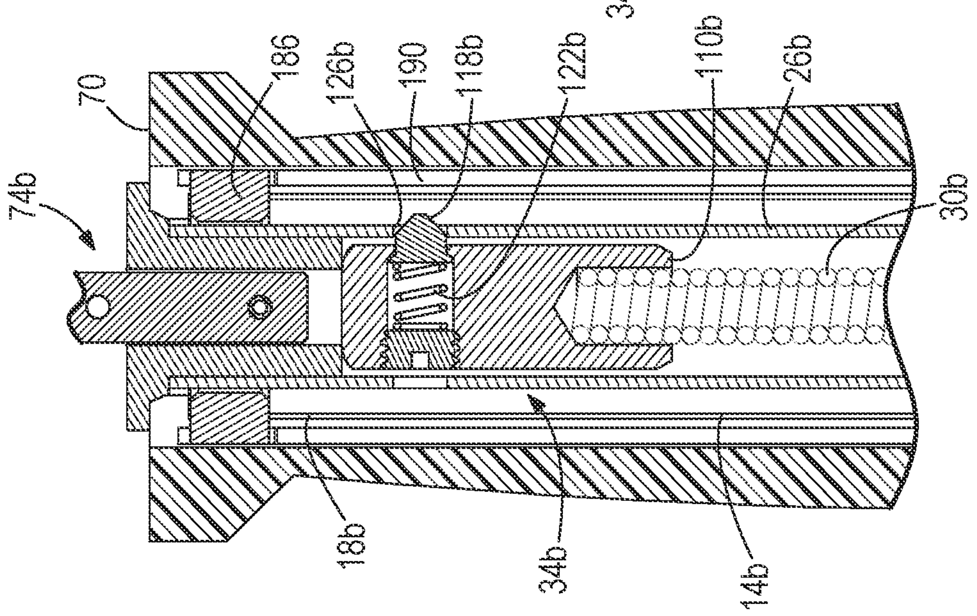
FIG. 17 is an enlarged cross-sectional view of a portion of the closet auger of FIG. 14, illustrating a detent release mechanism having a detent release collar in a disengaged position.

With reference to FIGS. 15-19, the closet auger 10*b* further includes a detent release mechanism 182 including an auto-actuation ring or collar 186 and a plurality of connecting rods 190. The annular collar 186 receives the drive member 26 and is slidingly movable relative to the casing member 14*b* between an upper position (FIG. 17) and a lower position (FIG. 19) adjacent the first end 46*b* of the casing member 14*b*. The connecting rods 190 connect the annular collar 186 to the movable handle 142*b* of the gripping assembly 138*b*, such that when the movable handle 142*b* is in the upper position (FIG. 7), the collar 186 is also in the upper position (FIG. 17), and when the movable handle 142*b* is in the lower position (FIG. 8), the collar 186 is also in the lower position (FIG. 19). The collar 186 is arranged to engage and depress the detent 118*b* of the connecting assembly 34*b* to unlock the detent 118*b* from either the first aperture 126*b* (FIG. 19) or the second aperture 130*b* of the drive member 26*b* when the collar 186 is moved to the lower position (FIG. 19). Accordingly, the length of the snake 30*b* may be dispensed from or retracted into the drive member 26*b* without needing to manually depress the detent 118*b*.

More specifically, during operation, when the drive member 26*b* is in the fully retracted position within the casing member 14*b*, the user pushes down on the movable handle 142*b* to move the handle 142*b* from the upper position to the lower position. This movement causes the gripping members 146*b* to grip the snake 30*b*, thereby inhibiting the snake 30*b* from axially moving relative to the casing member 14*b*, as described above with respect to the closet auger 10 of FIGS. 1-10. The connecting rods 190 also cause the collar 186 to move from the upper position (FIG. 17) to the lower position (FIG. 19), engaging and depressing the detent 118*b* against the bias of the spring 122*b* to unlock the detent 118*b* from the first aperture 126*b*. The user then pulls up on the crank handle 78*b* to extend the drive member 26*b* toward the second position. This causes the detent 118*b* to disengage from the first aperture 126*b* and unsheathe the length of the snake 30*b* within the drive member 26*b*, until the detent 118*b* reaches the second aperture 130*b* of the drive member 26. The detent 118*b* is then biased outwardly to engage the second aperture 130*b* and lock the snake 30*b* in the unsheathed configuration, as described above with respect to the closet auger 10 of FIGS. 1-10. The movable handle 142*b* may then be moved back to the upper position and the closet auger 10*b* before resuming operation of the closet auger 10*b*.

The detent release mechanism 182 may be similarly used in combination with the gripping assembly 138*b* to retract the length of the snake 30*b* back into the drive member 26 in the sheathed configuration. In particular, by moving the drive member 26*b* toward the extended position relative to the casing member 14*b* and moving the movable handle 142*b* to the lower position (FIG. 8), the collar 186 is moved to engage and depress the detent 118*b* to unlock the detent 118*b* from the second aperture 130*b*. While being retained by the gripping members 146*b*, the drive member 26*b* may then be retracted into the casing member 14*b* toward the first position, until the detent 118*b* reaches the first aperture 126*b* of the drive member 26*b*. The detent 118*b* is then biased outwardly to engage the first aperture 126*b* and lock the snake 30*b* in the sheathed configuration.

FIGS. 20-24 illustrate a closet auger 10*c* in accordance with yet another embodiment of the invention. Like components and features are identified with like reference numerals plus the letter "c" and will not be described again in detail.

Figure 20:
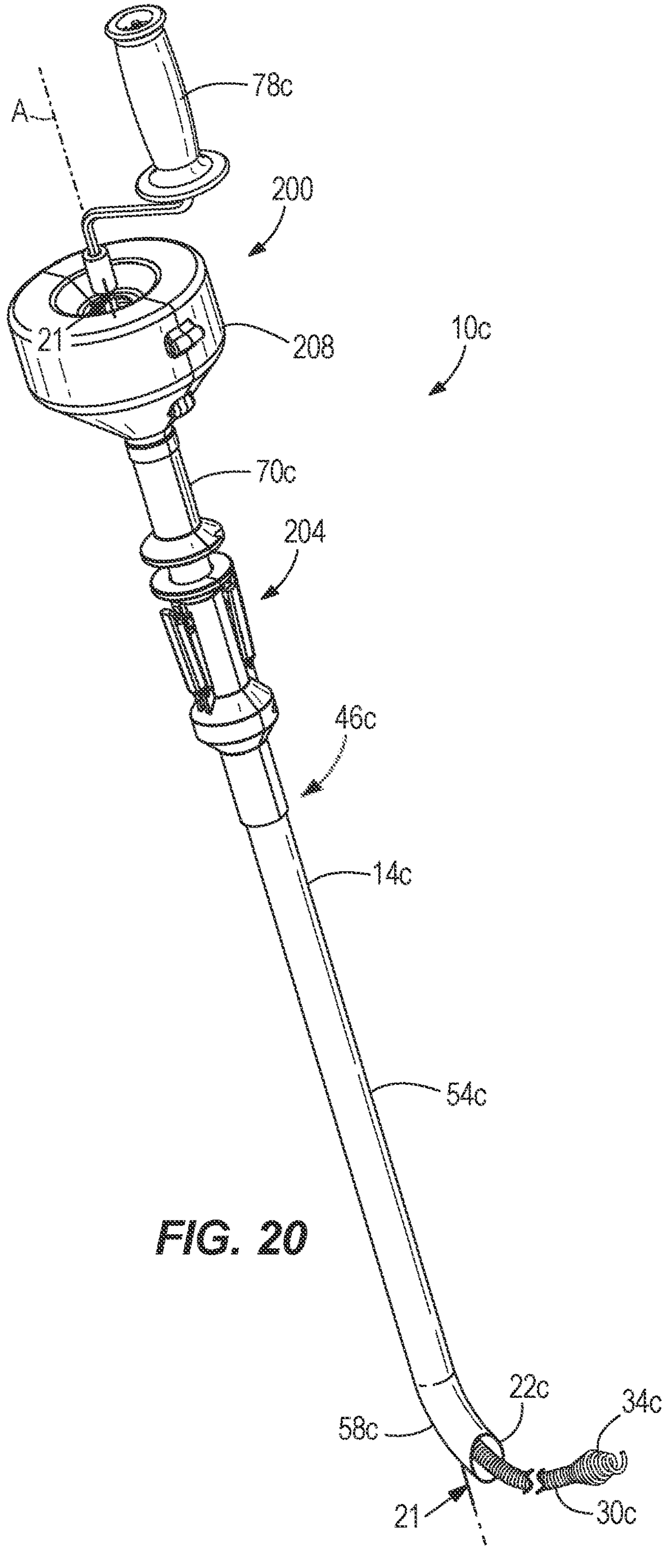
FIG. 20 is a perspective view a closet auger in accordance with still yet another embodiment of the invention.
Figure 21:
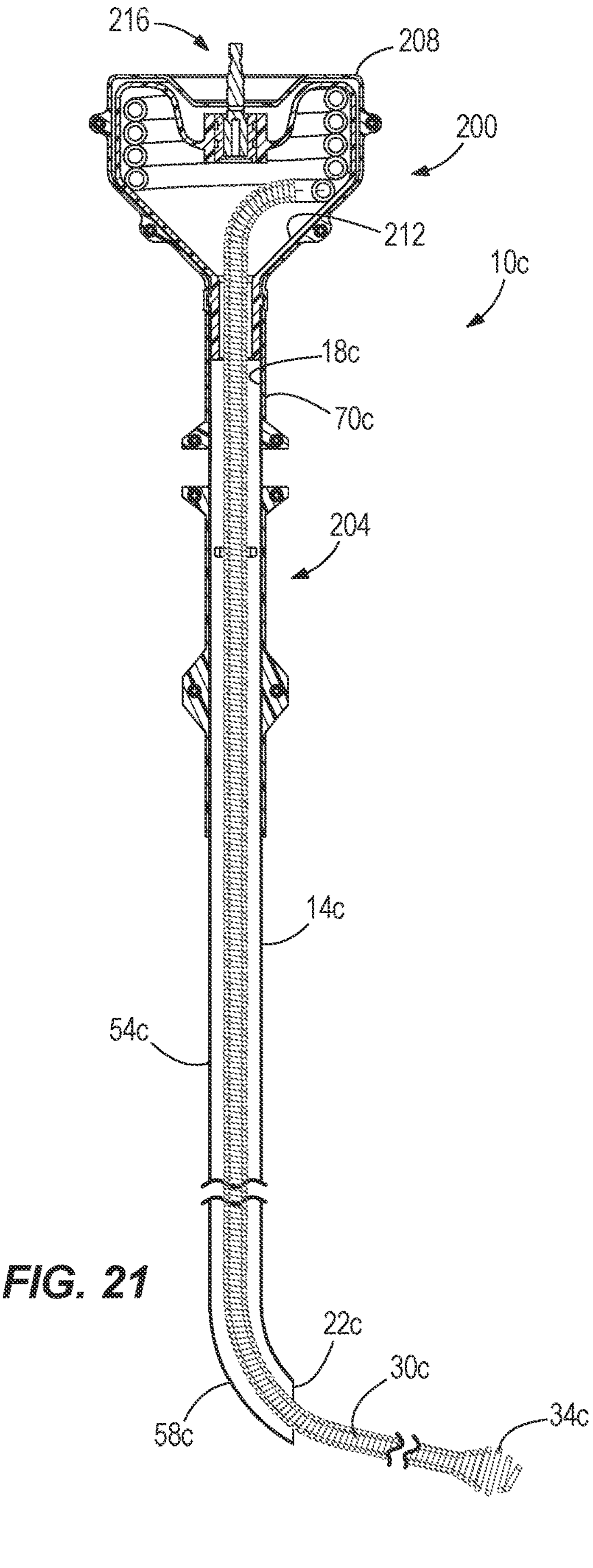
FIG. 21 is a cross-sectional view of the closet auger of FIG. 20 taken along line 21-21 in FIG. 20.

With reference to FIG. 20, the closet auger 10*c* includes a drum assembly 200 and a feed assembly 204. The drum assembly 200 is located at the first end 46*c* of the casing member 14*c* and includes a drum shroud 208 coupled to the first end 46*c*, and a rotatable drum 212 enclosed in and rotatably supported by the drum shroud 208 about the longitudinal axis A of the casing member, as shown in FIG. 21. In the illustrated embodiment, the fixed handle 70*c* is integrally formed with the drum shroud 208, but in other embodiments may be separate. The rotatable drum 212 is in communication with the upper end 18*c* of the casing member 14*c*. The rotatable drum 212 includes a drive coupling 216 that may be engaged by the crank handle 78*c* such that the rotatable drum 212 may be manually rotationally driven by the crank handle 78*c* about the axis A. Alternatively, a motorized drive unit (e.g., the motorized drive unit 82 of FIG. 25) may be coupled to the drive coupling 216 to drive the rotatable drum 212. A portion of the snake 30*c* may be coiled inside the rotatable drum 212 about the longitudinal axis A for storage. The portion of the snake 30*c* coiled inside the rotatable drum 212 frictionally engages an inner surface of the rotatable drum 212 as the rotatable drum 212 is rotationally driven by the drive coupling 216 such that snake 30*c* is rotationally driven about its length with the rotatable drum 212.

Figure 24:
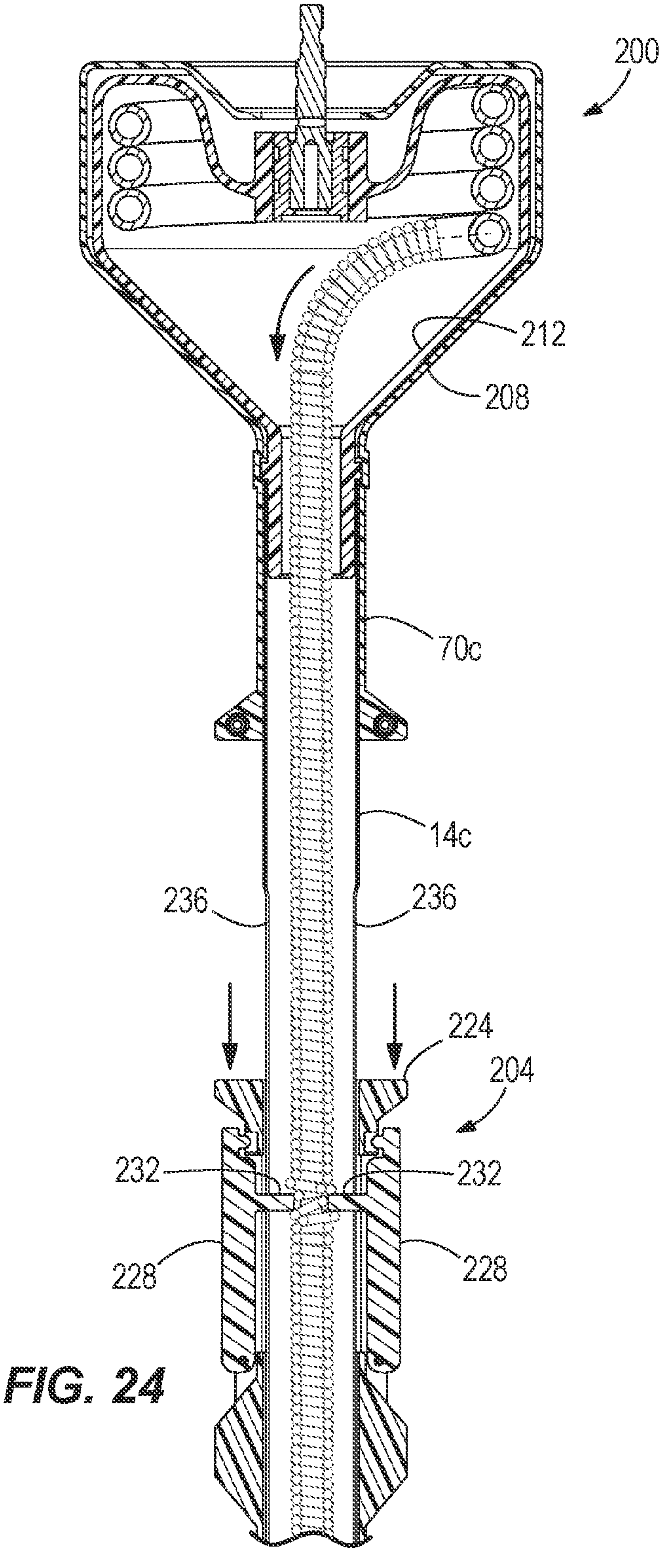
FIG. 24 is a cross-sectional view of the portion of the closet auger of FIG. 22, illustrating the feed assembly in a third position.

The feed assembly 204 is provided to selectively feed a length of the snake 30*c* into or out of the drum 212, and thus into or out of the lower end 22*c* of the casing member 14*c* without the user's hand needing to contact the snake 30*c*. With continued reference to FIGS. 20-21, the feed assembly 204 includes a feed handle 224 and a pair of feed gripping members 228. The feed handle 224 is arranged to slide along the casing member between an upper position (FIG. 22) and a lower position (FIG. 24). The gripping members 228 are circumferentially spaced about the axis A. In the illustrated embodiment, the feed assembly 204 includes two gripping members 228 on opposite sides of the casing member 14*c*. In other embodiments, the 204 may include fewer or more gripping members 228. Each of the feed gripping members 228 includes a first end pivotally coupled to the feed handle 224 and a second end biased radially outward from the feed handle 224. Each of the feed gripping members 228 also has a grip projection 232 at the second end that extends into the casing member through corresponding elongated slots 236. The feed gripping members 228 are pivotable radially inward from an expanded position (FIG. 22) to a collapsed position (FIG. 23) to grip the snake 30*c* between the grip projections 232, thus securing the snake 30*c* for axial movement with the feed assembly 204 along longitudinal axis A. While in the collapsed position, the grip projections 232 may move within the slots 236 as the feed assembly 204 is moved between the upper position (FIG. 23) and the lower position (FIG. 24). In some embodiments, the feed gripping members 228 may be biased by a spring (not shown) to the disengaged position, shown in FIG. 22. In some embodiments, the feed assembly 204 may include at least one feed gripping member 228. In such embodiments, the feed gripping member 228 may grip the snake 30*c* between the grip projection 232 of the feed gripping member 228 and a portion of the movable handle 224, or a projection extending from the movable handle 224, in the collapsed position.

Figure 22:
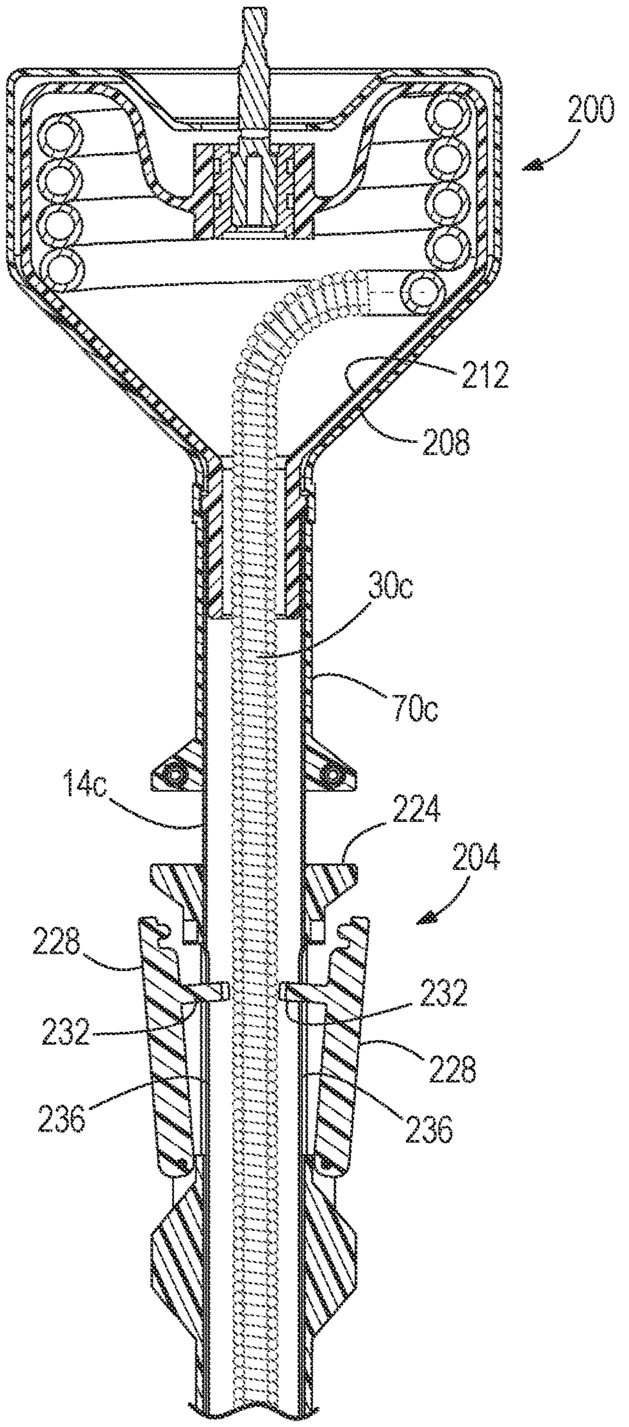
FIG. 22 is a cross-sectional view of a portion of the closet auger of FIG. 20, illustrating a feed assembly in a first position.
Figure 23:
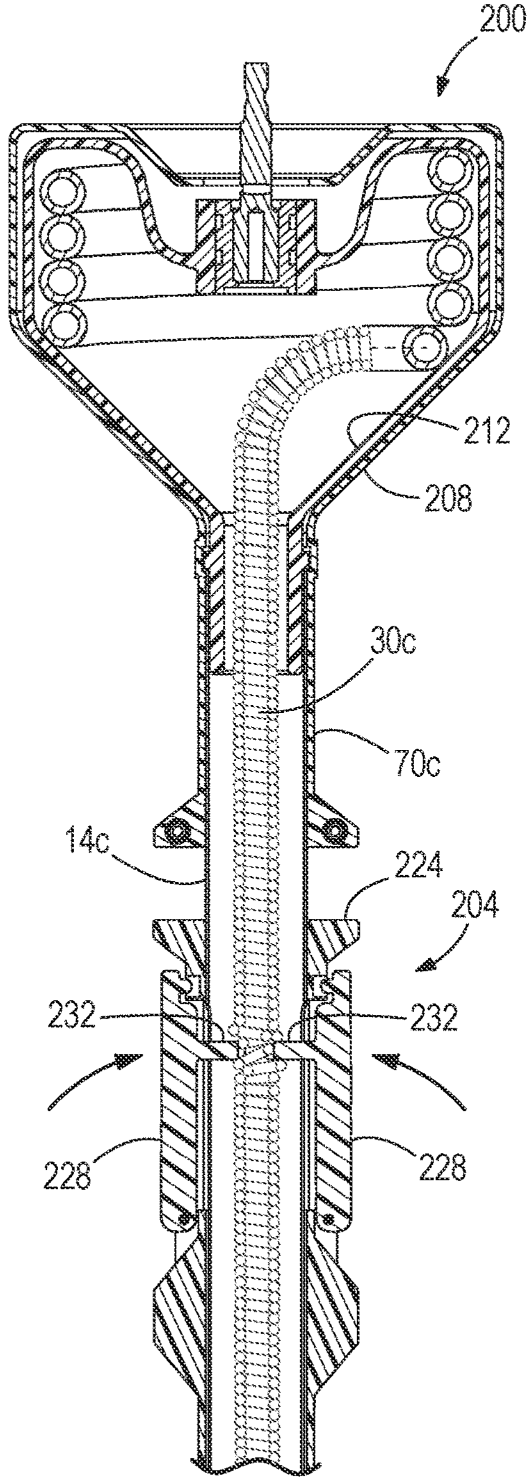
FIG. 23 is a cross-sectional view of the portion of the closet auger of FIG. 22, illustrating the feed assembly in a second position.

In operation, the user may feed the snake 30*c* from the rotatable drum 212 and out the lower end 22*c* of the casing member 14*c* by first grasping the feed handle 224 and the feed gripping members 228 while the feed assembly 204 is in the upper position (FIG. 22). The feed gripping members 228 are pivoted radially inward to the collapsed position (FIG. 23) to grip the snake 30*c* between the grip projections 232. While continuing to hold the feed gripping members 228 in the collapsed position, the user moves the feed assembly 204 downward to the lower position (FIG. 24), causing the feed gripping members 228 to pull a set length of the snake 30*c* out of the rotatable drum 212. The set length is equal to the distance traveled by the feed assembly to the lower position. The feed gripping members 228 are then returned to the expanded position (e.g., by bias of a spring), and the feed assembly 204 is slid back up to the upper position (FIG. 22). This process may be repeated until a sufficient length of the snake 30*c* has been uncoiled from the rotatable drum 212 or the stoppage has been broken up or removed. The user may rotationally drive the snake 30*c* through rotation of the drum 212 by rotationally driving the drive coupling 216 via a crank handle or motorized drive unit to assist in breaking up and removing the stoppage.

Once the stoppage has been removed, in order to feed the snake 30*c* back into the rotatable drum 212, the same steps as above are used except in reverse. More specifically, while the feed assembly 204 is in the lower position the user may grasp the feed gripping members 228 to pivot the feed gripping members 228 radially inward to the collapsed position to engage the snake 30*c* between the grip projections 232, as shown in FIG. 24. While continuing to hold the feed gripping members 228 in the collapsed position, the user moves the feed assembly upwardly to the upper position (FIG. 24), causing the feed gripping members 228 to push a length of the snake 30*c* into the lower end 22*c* of the casing member 14*c* and feed the length back into the rotatable drum 212. The length is coiled about the axis A of the drum 212 and is equal to the distance traveled by the feed assembly to the upper position. The feed gripping members 228 are then returned to the expanded position (e.g., by bias of a spring), and the feed assembly is slid back down to the lower position before again gripping the snake 30*c* with the feed gripping members 228 in the collapsed position (FIG. 24). This process is repeated until the coiled portion of the snake 30*c* has been coiled back into the drum 212.

In various embodiments, different cables may be used with any of the closet augers 10, 10*a*, 10*b*, 10*c*. For example, the cables may be polymer-coated metal, all polymer, polymer composite, etc. The polymer materials are corrosion-resistant, and protect fixtures (e.g., porcelain fixtures, etc.) from damage by the cable.

Although the invention has been described in detail with reference to certain preferred embodiments, variations and modifications exist within the scope and spirit of one or more independent aspects of the invention as described.

One or more independent features and/or independent advantages of the invention may be set forth in the claims.

What is claimed is:

1. A closet auger comprising:
- an elongated casing member extending along an axis;
- an elongated drive member telescopically received in the casing member and movable between an extended position and a retracted position relative to the casing member along the axis, the drive member being rotatable relative to the casing member about the axis; and
- a flexible cable having an end removably connectable to the drive member in a first configuration, where a length of the flexible cable is retracted within the drive member, and a second configuration, where the length of the flexible cable extends from the drive member.

2. The closet auger of claim 1, wherein the end of the flexible cable is connected adjacent to a first end of the drive member when in the first configuration, and is connected adjacent to a second end of the drive member when in the second configuration.

3. The closet auger of claim 2, wherein the drive member includes a first aperture adjacent the first end and a second aperture adjacent the second end, and wherein the end of the flexible cable includes a spring biased detent that engages the first aperture when in the first configuration and engages the second aperture when in the second configuration.

4. The closet auger of claim 3, further comprising:
- a handle movable relative to the casing member; and
- a detent release mechanism coupled to the handle for movement with the handle, the detent release mechanism selectively engageable with the spring biased detent as the handle moves to disengage the spring biased detent from the first aperture and the second aperture.

5. The closet auger of claim 1, further comprising a manual crank handle or a motorized drive unit connected to an end of the drive member to rotatably drive the drive member about the axis relative to the casing member.

6. The closet auger of claim 1, further comprising a cable retention assembly supported by the casing member, the cable retention assembly configured to selectively engage the flexible cable to inhibit movement of the flexible cable relative to the casing member, the drive member being movable relative to the flexible cable when the cable retention assembly engages the flexible cable to change between the first configuration and the second configuration.

7. The closet auger of claim 6, wherein the cable retention assembly includes a cable retention member movable radially inward relative to the casing member to engage the flexible cable.

8. The closet of auger of claim 7, wherein the cable retention member is a flexible spring member having a first end and a second end, and wherein the first end is fixed to the casing member and the second end is biased radially outward from the casing member and movable radially inward relative to the casing member to engage the flexible cable.

9. The closet auger of claim 7, wherein the cable retention assembly includes a cam member selectively movable along the axis relative to the casing member to move the cable retention member radially inward to engage the flexible cable.

10. The closet auger of claim 9, wherein the cable retention assembly includes a movable handle to which the cam member is coupled for movement therewith.

11. The closet auger of claim 1, further comprising a connection assembly at the end of the cable, the connection assembly connecting the cable to the drive member, the connection assembly including a body with a first cross-section.

12. The closet auger of claim 11, wherein the drive member includes a second cross-section, and wherein the first cross-section is a similar shape to the second cross-section to transfer torque from the drive member to the flexible cable and allow the flexible cable to slide between the first configuration and the second configuration.

13. The closet auger of claim 12, wherein the first and second cross-sections are square.

14. The closet auger of claim 13, wherein the casing member includes a third cross-section, the third cross-section being circular.

15. The closet auger of claim 1, further comprising a handle coupled to the casing member to hold the closet auger in place during operation.

16. The closet auger of claim 15, wherein the drive member includes a stop that engages a portion of the handle to inhibit removal of the drive member from the casing.

17. The closet auger of claim 1, further comprising a coupling mechanism configured to couple the drive member to a crank handle or a motorized drive unit for rotationally driving the drive member relative to the casing member, the coupling mechanism extending from the drive member.

18. The closet auger of claim 1, further comprising a clip to secure and hold a portion of the flexible cable outside of the casing member.

19. A closet auger comprising:
- an elongated casing member extending along an axis;
- an elongated drive member telescopically received in the casing member and movable between an extended position and a retracted position relative to the casing member along the axis, the drive member being rotatable relative to the casing member about the axis; and
- a flexible cable coupled to the drive member for movement with the drive member;
- wherein the flexible cable is at least partially made from a polymer material configured to be corrosion-resistant.

20. The closet auger of claim 19, wherein the polymer material is a polymer-coated metal, a polymer composite, or entirely polymer.

21. The closet auger of claim 19, wherein the cable includes an end that is removably coupled to the drive member in a first configuration, where a length of the flexible cable is retracted within the drive member, and a second configuration, where the length of the flexible cable extends from the drive member.

* * * * *